United States Patent
Takagi et al.

(10) Patent No.: US 7,925,312 B2
(45) Date of Patent: Apr. 12, 2011

(54) MOBILE TERMINAL DEVICE

(75) Inventors: Hisamitsu Takagi, Kawasaki (JP);
Satoshi Kanbayashi, Kawasaki (JP);
Hayato Shida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 12/029,654

(22) Filed: Feb. 12, 2008

(65) Prior Publication Data
US 2008/0194303 A1 Aug. 14, 2008

(30) Foreign Application Priority Data
Feb. 14, 2007 (JP) ................................ 2007-033702

(51) Int. Cl.
*H04M 1/00* (2006.01)

(52) U.S. Cl. ................. 455/575.1; 455/575.3; 455/90.3; 455/575.4; 455/550.1; 379/428.01; 379/433.11; 379/433.12; 379/420.01; 379/433.13

(58) Field of Classification Search ............... 455/575.1, 455/575.3, 575.4, 90.3, 550.1; 379/428.01, 379/433.11, 433.12, 433.13
See application file for complete search history.

(56) References Cited

U.S. PATENT DOCUMENTS

| | | | | |
|---|---|---|---|---|
| 5,636,275 A * | 6/1997 | Takagi et al. | ............ | 379/433.13 |
| 5,692,045 A * | 11/1997 | Takagi et al. | ............ | 379/433.13 |
| 5,859,909 A * | 1/1999 | Takagi et al. | ............ | 379/433.13 |
| 6,330,331 B1 * | 12/2001 | Takagi et al. | ............ | 379/433.13 |
| 6,754,507 B2 * | 6/2004 | Takagi | ............ | 455/575.1 |
| 6,983,175 B2 * | 1/2006 | Kwon | ............ | 455/575.1 |
| 6,999,802 B2 * | 2/2006 | Kim | ............ | 455/575.1 |
| 7,369,882 B2 * | 5/2008 | Hwang et al. | ............ | 455/575.1 |
| 7,414,834 B2 * | 8/2008 | Ukonaho et al. | ............ | 361/679.55 |
| 7,450,977 B2 * | 11/2008 | Oe et al. | ............ | 455/575.3 |
| 7,555,120 B2 * | 6/2009 | Joo | ............ | 379/433.12 |
| 7,574,242 B2 * | 8/2009 | Lee et al. | ............ | 455/575.1 |
| 7,596,358 B2 * | 9/2009 | Takagi | ............ | 455/90.3 |
| 2003/0203747 A1 | 10/2003 | Nagamine | | |
| 2004/0198474 A1 * | 10/2004 | Jung et al. | ............ | 455/575.1 |
| 2005/0054396 A1 * | 3/2005 | Yang | ............ | 455/575.3 |
| 2005/0124392 A1 * | 6/2005 | Jeong | ............ | 455/575.1 |
| 2006/0045261 A1 * | 3/2006 | Duan et al. | ............ | 379/433.13 |
| 2007/0037618 A1 * | 2/2007 | Lee | ............ | 455/575.4 |
| 2008/0045279 A1 * | 2/2008 | Ohki | ............ | 455/575.1 |

FOREIGN PATENT DOCUMENTS

JP 2003-319043 A 11/2003
KR 10-2006-0095310 A 8/2006

OTHER PUBLICATIONS

Korean Office Action dated Aug. 31, 2006, issued in corresponding Korean Patent Application No. 2006-0095310.

* cited by examiner

*Primary Examiner* — Marceau Milord
(74) *Attorney, Agent, or Firm* — Westerman, Hattori, Daniels & Adrian, LLP

(57) ABSTRACT

According to an aspect of an embodiment, a mobile terminal device includes a lower casing, an upper casing, and an intermediate casing, an intermediate casing connected to the lower casing by a hinge structure which enables the intermediate casing to rotate about an axis, the intermediate casing supporting a back surface of the upper casing by a front surface of the intermediate casing, wherein the upper casing has a first groove formed in a vertical direction with respect to the rotation axis on a surface facing the intermediate casing, the intermediate casing has a first portion protruding from a surface facing the upper casing and fitting the groove of the upper casing, and the upper casing is rotatable with respect to the intermediate casing for the portion being guided by the groove.

15 Claims, 27 Drawing Sheets

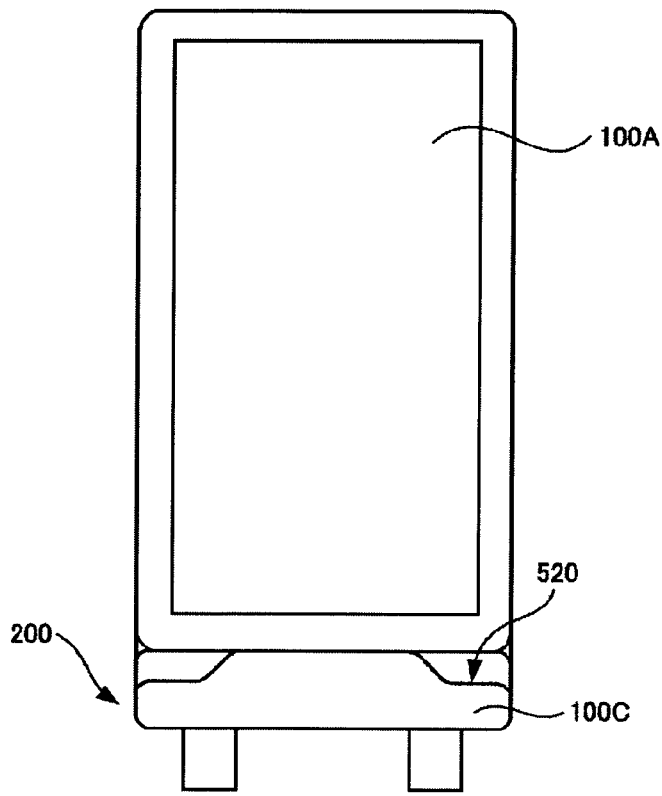
Fig. 8A
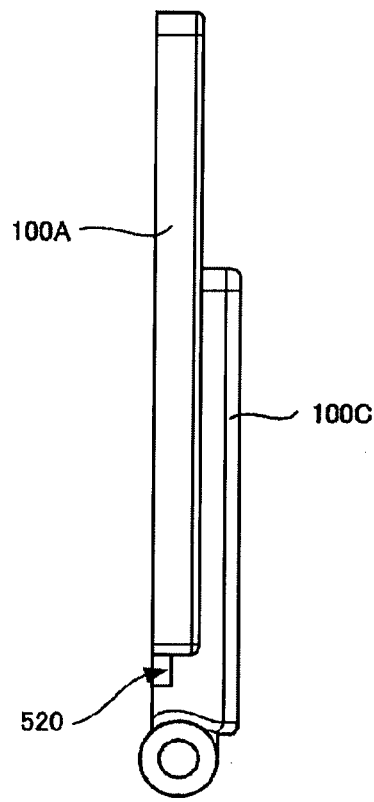
Fig. 8B
Fig. 9
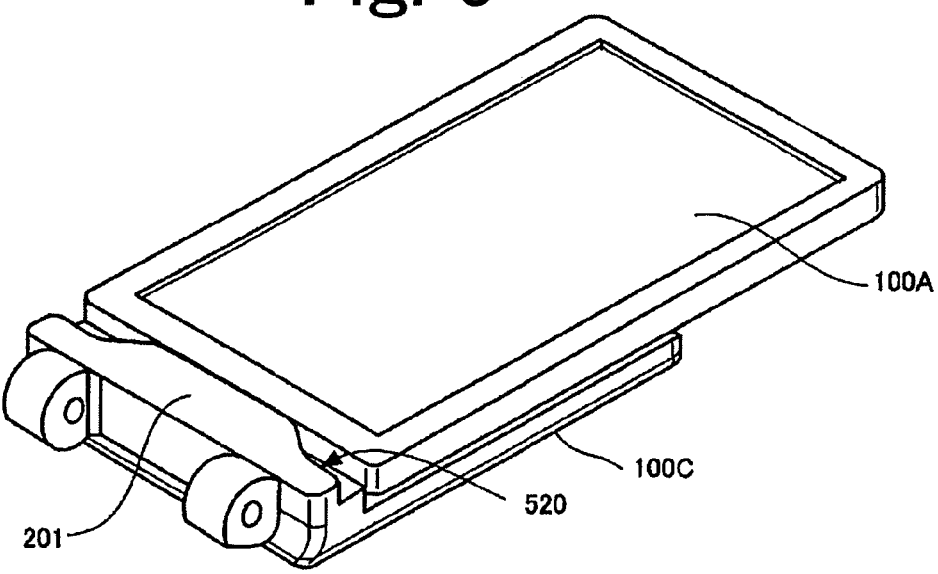

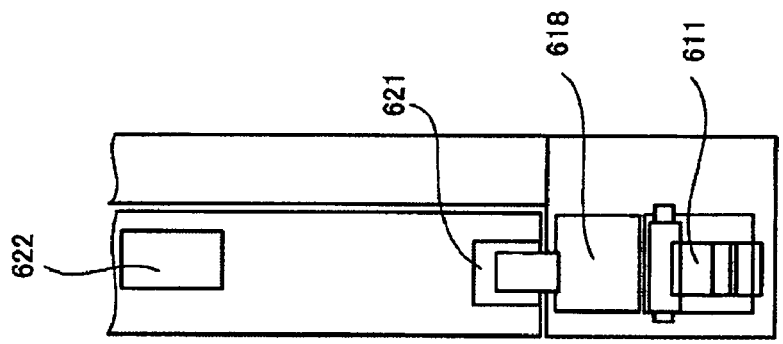
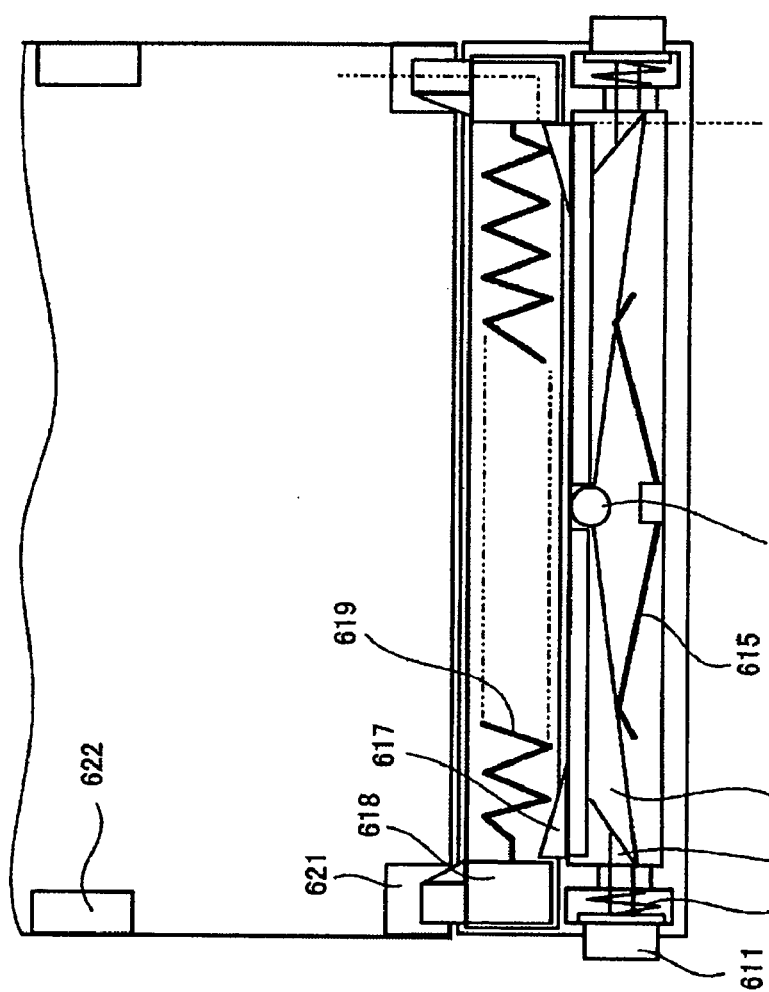
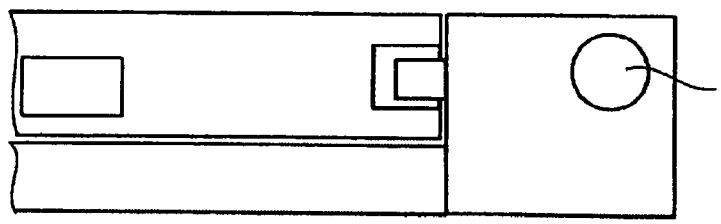

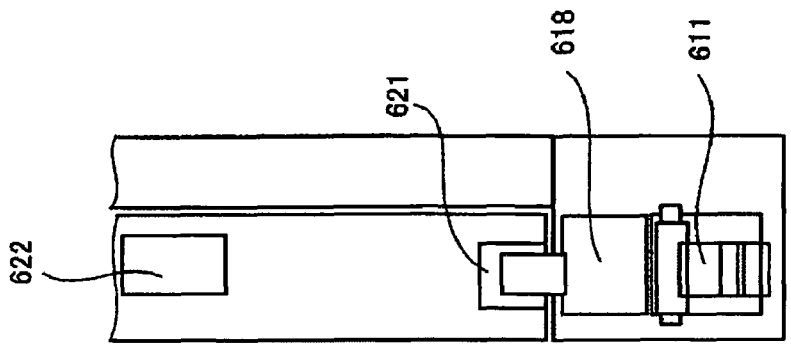
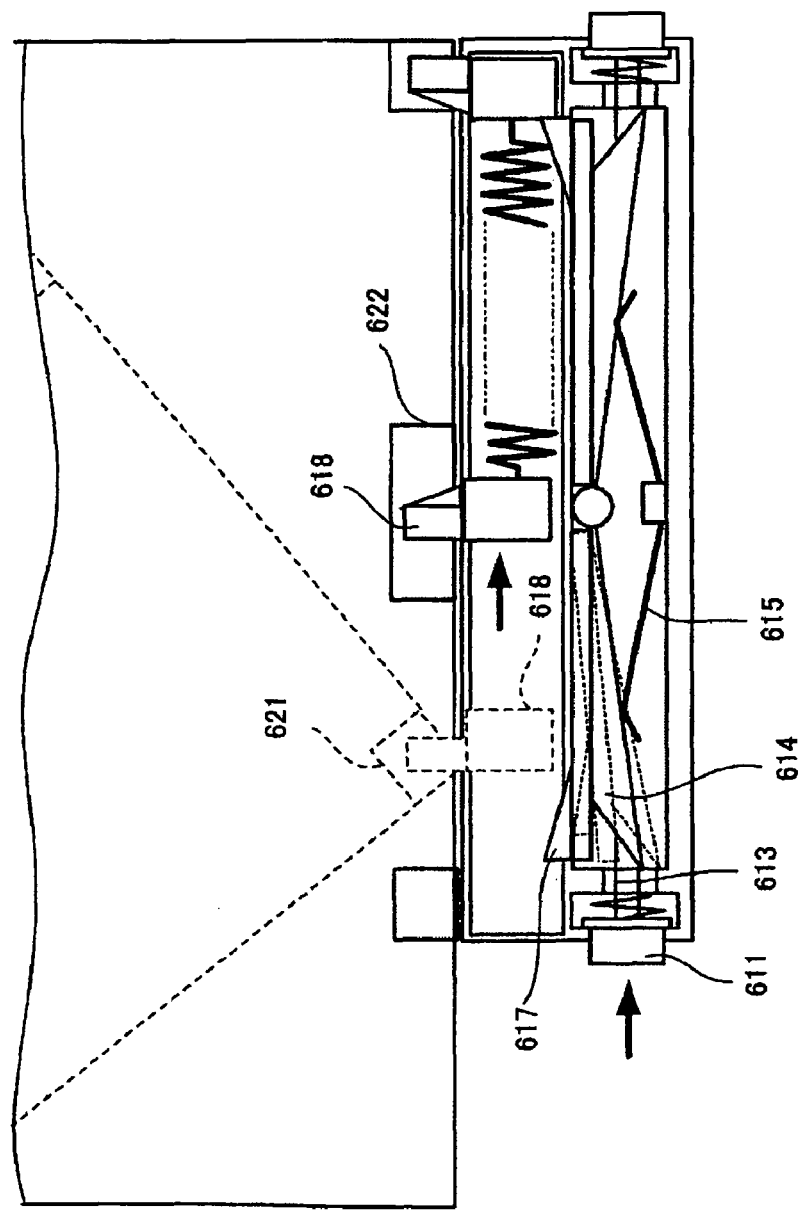
Fig. 12A
Fig. 12B

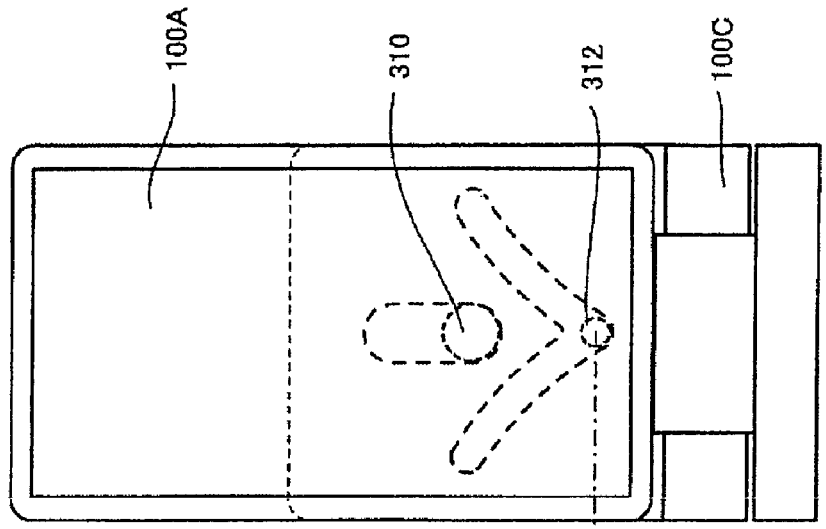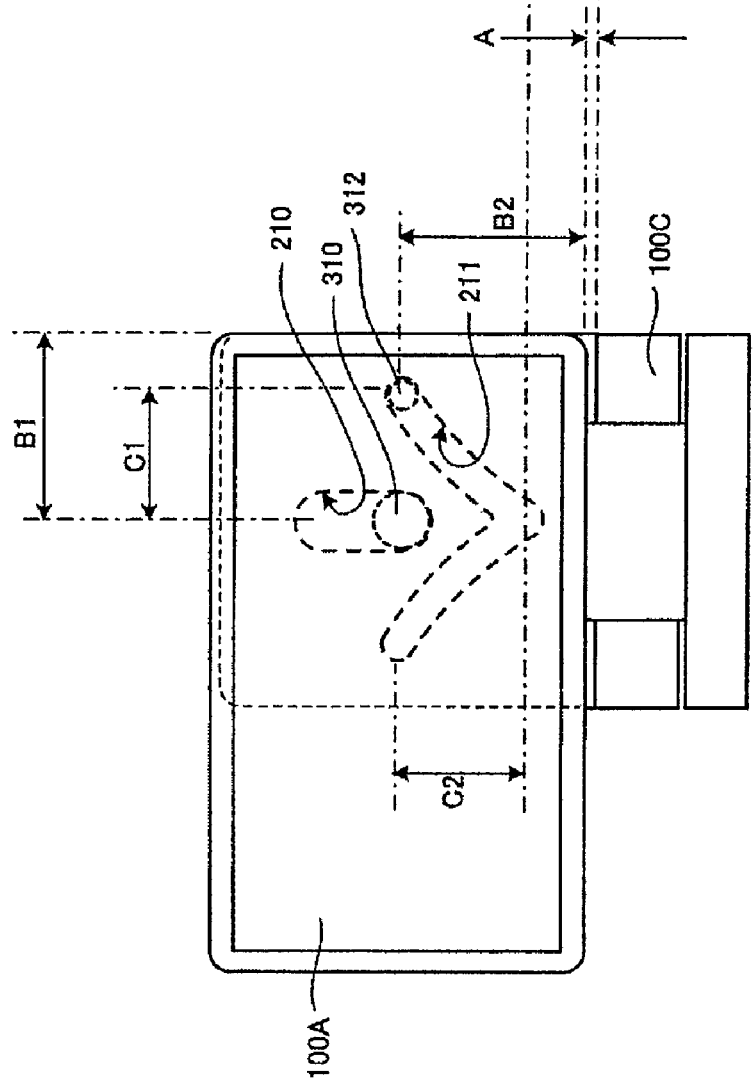
Fig. 21B
Fig. 21A

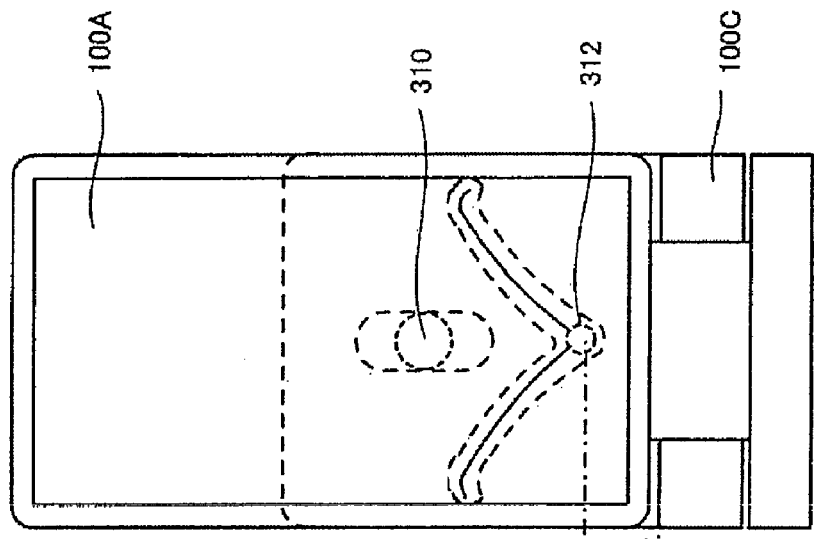
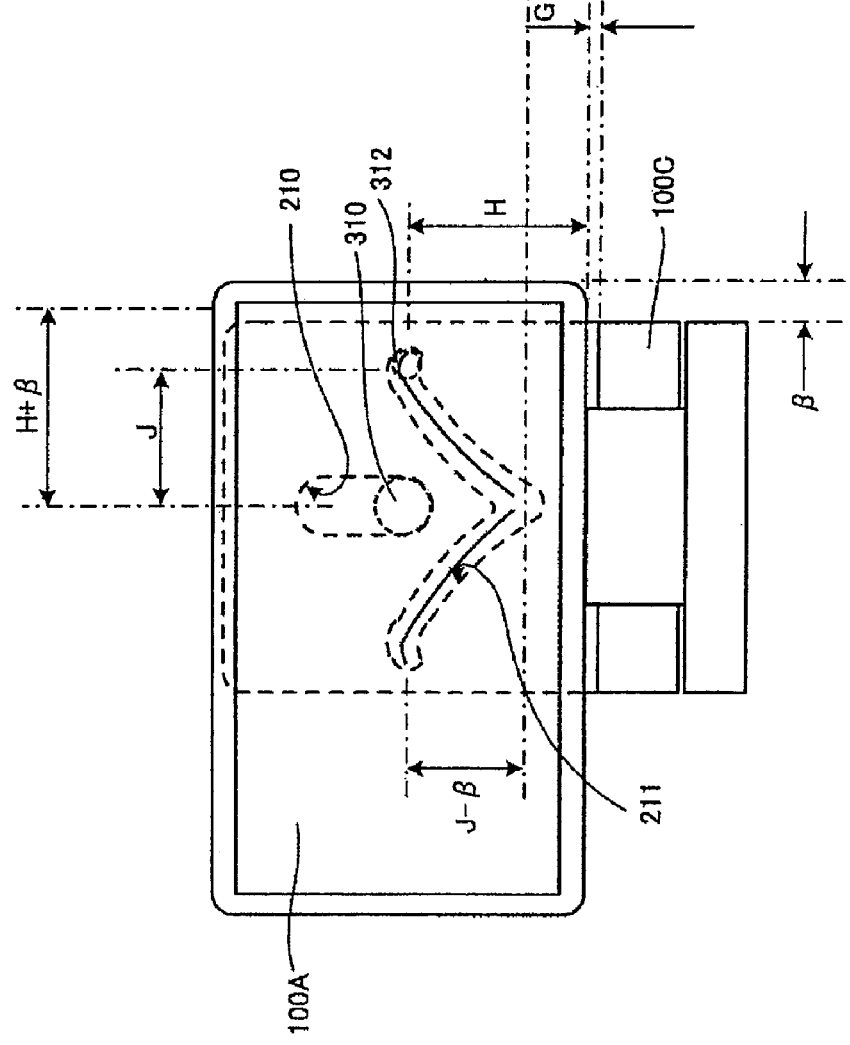
Fig. 23B
Fig. 23A

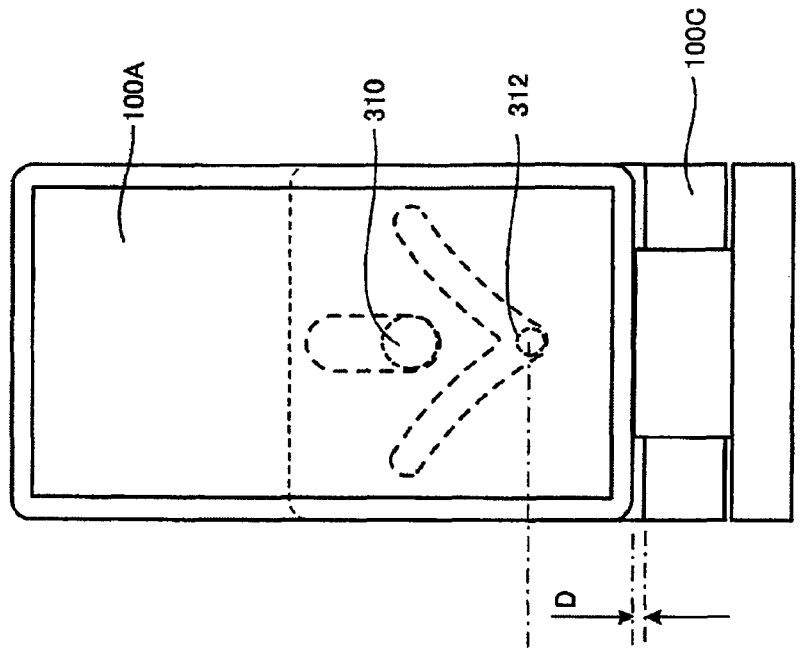
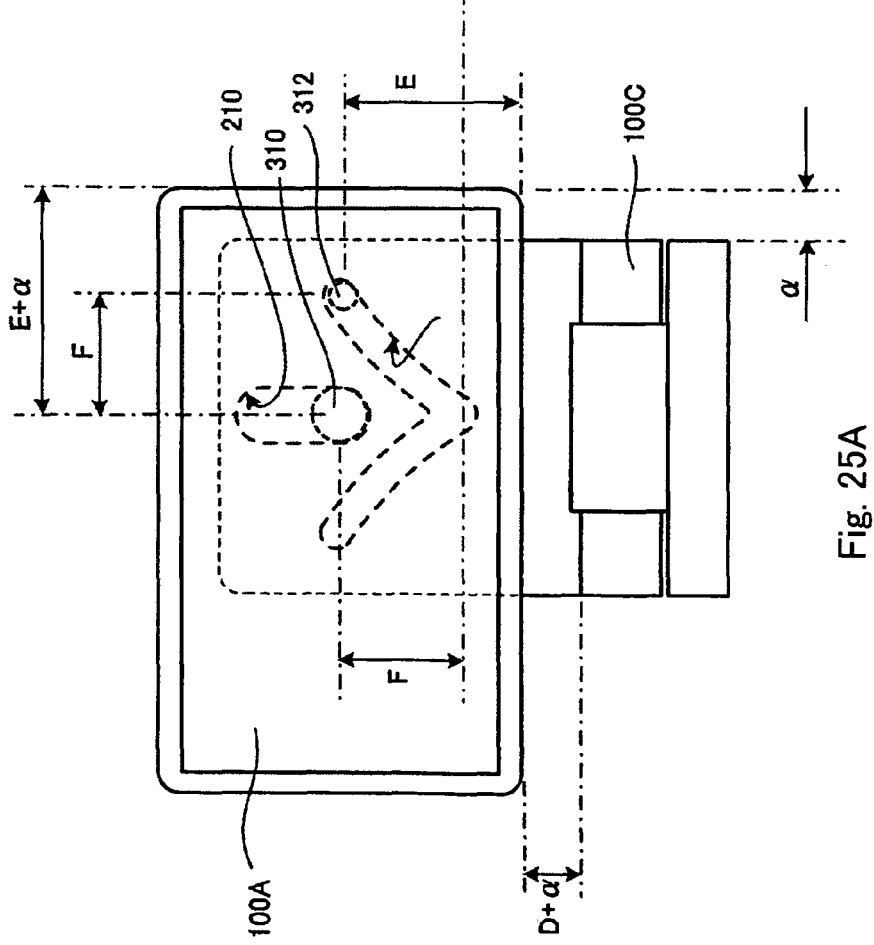
Fig. 25A
Fig. 25B

MOBILE TERMINAL DEVICE

BACKGROUND OF THE INVENTION

1. Field of the Invention

The present invention relates a foldable mobile terminal device in which an upper casing and a lower casing are rotatably coupled.

2. Description of the Related Art

In recent years, the mobile phone is equipped with a camera function for photographing subjects, a browser function for browsing web sites, a television function for viewing television programs and so on, in addition to a standard talking function, a transmission/reception function for electronic mails, etc. The mobile phone has been used not only as means for performing communications, but also has been used, among people of all ages, as one's own multifunctional terminal that substitutes for a digital camera, personal computer, and television.

However, although usual televisions or personal computers have a display screen with a horizontally elongated shape, mobile phone terminals typically have a vertically elongated shape on a whole, and the display screen thereof has also a vertically elongated shape in order to improve holdability or operability by one hand. As a consequence, when a horizontally elongated shaped image displayed on a television or personal computer is browsed by the mobile telephone, the image is often displayed by reducing its size in keeping with the display screen of a vertically elongated shape, or the image is often displayed sideways with respect to the display screen and a user browses the image by holding sideways the mobile phone. This raises a problem that either of the size of an image and the holdability of the mobile phone becomes victim to the other.

Japanese Unexamined Patent Application Publication No. 2003-319043 discloses a foldable mobile phone including an upper casing having a display screen, a lower casing having an operator, and a support casing that is hingedly connected to the lower casing and that supports the upper casing so as to be able to rotate the upper casing in the left/right direction about a shaft.

However, as shown in FIG. 2 in the above-described patent document, in order to prevent corners of the upper casing from suffering interference from the hinge when the upper casing is rotated about the shaft provided to the support casing, the lower edge of the upper casing must be significantly curved from its center toward the left and right edge of the upper casing 100A. As a result, in the foldable mobile phone set forth in this patent document, there occurs a problem that the display screen is reduced in size or the design of the device is limited.

SUMMARY

A mobile terminal device comprises a lower casing, an upper casing, and an intermediate casing. The intermediate casing is connected to the lower casing by a hinge structure which enables the intermediate casing to rotate about an axis. The intermediate casing supports a back surface of the upper casing by a front surface of the intermediate casing. A first casing which is either the upper casing or the intermediate casing has a first groove formed in a vertical direction with respect to the rotation axis on a surface facing a second casing which is the other of the upper casing and the intermediate casing, the second casing has a first portion protruding from a surface facing the first casing and fitting the groove of the first casing, and the upper casing is rotatable with respect to the intermediate casing for the portion being guided by the groove.

BRIEF DESCRIPTION OF THE DRAWINGS

FIGS. 8A and 8B, respectively, are a front view and side view of the upper casing and the intermediate casing in a mobile phone according to a third embodiment of the present invention;

FIG. 9 is an oblique perspective view of the upper casing and the intermediate casing according to a third embodiment of the present invention;

FIGS. 11A to 11C are enlarged diagrams each showing the vicinity of buttons in the mobile phone according to a fourth embodiment of the present invention;

FIGS. 12A and 12B are diagrams each showing an operation when one of the buttons is pushed;

FIGS. 21A and 21B are diagrams showing various dimensions in the mobile phone;

FIGS. 23A and 23B are diagrams showing various dimensions in a mobile phone according to a seventh embodiment of the present invention;

FIGS. 25A and 25B are diagrams showing various dimensions in a mobile phone according to an eighth embodiment of the present invention;

DESCRIPTION OF THE PREFERRED EMBODIMENTS

Hereinafter, embodiments of the present invention will be described with reference to the appended drawings.

Figure 1:
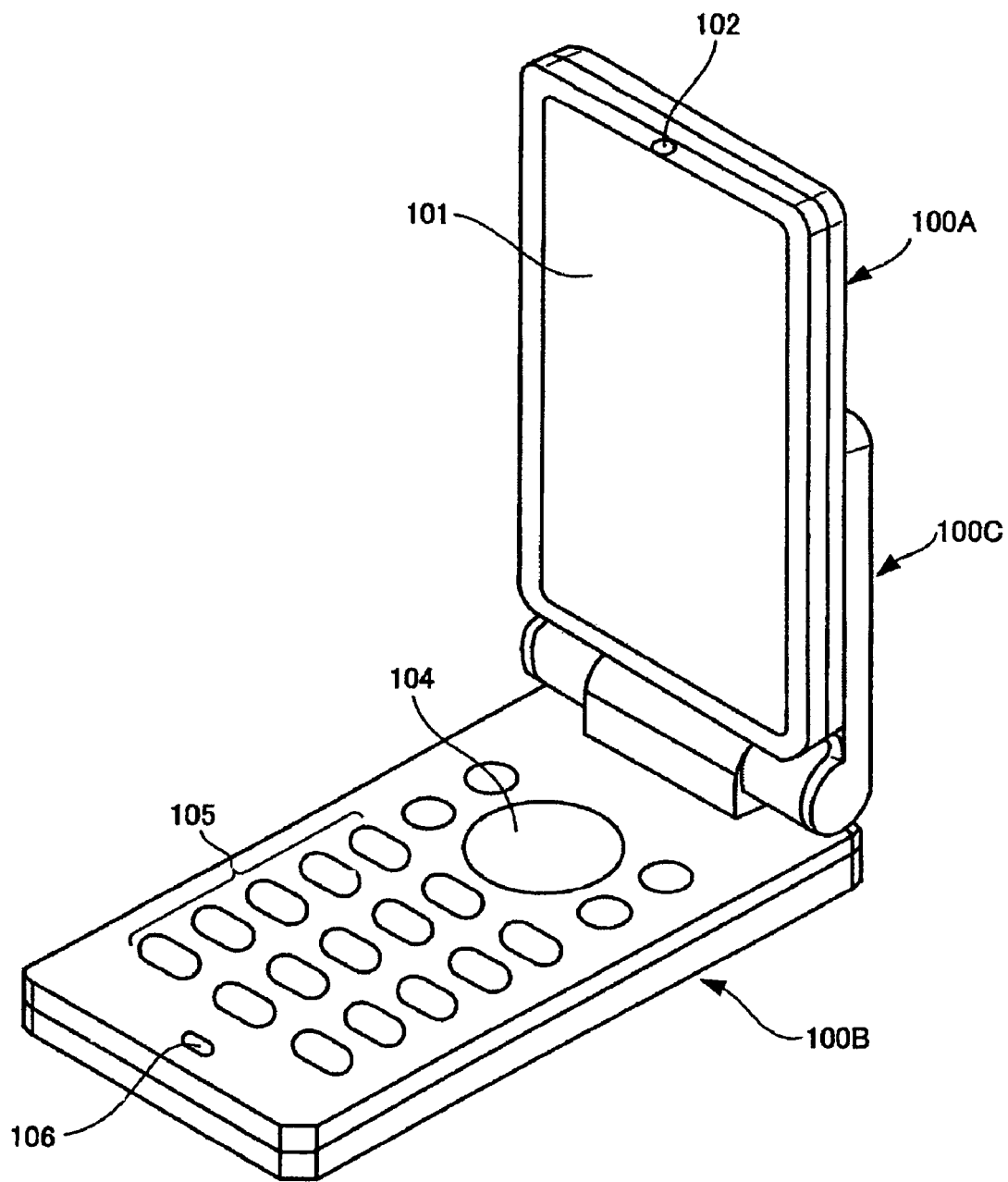
FIG. 1 is a diagram showing an external appearance of a mobile phone according to an embodiment of the present invention.

FIG. 1 is a diagram showing an external appearance of a mobile phone to which an embodiment of the present invention has been applied;

The mobile phone shown in FIG. 1 is equipped with a photographing function for photographing subjects, a television function for viewing television programs, etc., in addition to data communications function for exchanging voices and electronic mails with an external device.

The mobile phone includes an upper casing 100A with a liquid crystal panel 101, a lower casing 100B held in a hand by a user, and an intermediate casing 100C hingedly connected to the lower casing 100B. The upper casing 100A is supported by the intermediate casing 100C so as to be turnable in the right and left directions, and the upper casing 100A and the intermediate casing 100C are integrally opened/closed with respect to the lower casing 100B. The upper casing 100A is one example of what the present invention terms "upper casing", and the lower casing 100B is one example of what the present invention terms "lower casing", and the intermediate casing 100C is one example of what the present invention terms "intermediate casing". The construction of each of these upper casing 10A, lower casing 100B, and intermediate casing 100C is described in detail later.

The upper casing 100A includes the liquid crystal panel 101 on which telephone numbers, television programs, photographed images and the like are displayed, a speaker (refer to FIG. 2) provided inside, and a mouthpiece 102 for uttering voices issued from a speaker. The lower casing 100B includes a selection button 104 used for the selection of various functions and used as a shutter button in photographing, push buttons 105 for inputting telephone numbers and so on, a microphone (refer to FIG. 2) provided inside, and an ear piece 106 for transmitting the voices to the microphone.

Next, the internal structure of the mobile phone will be described.

Figure 2:
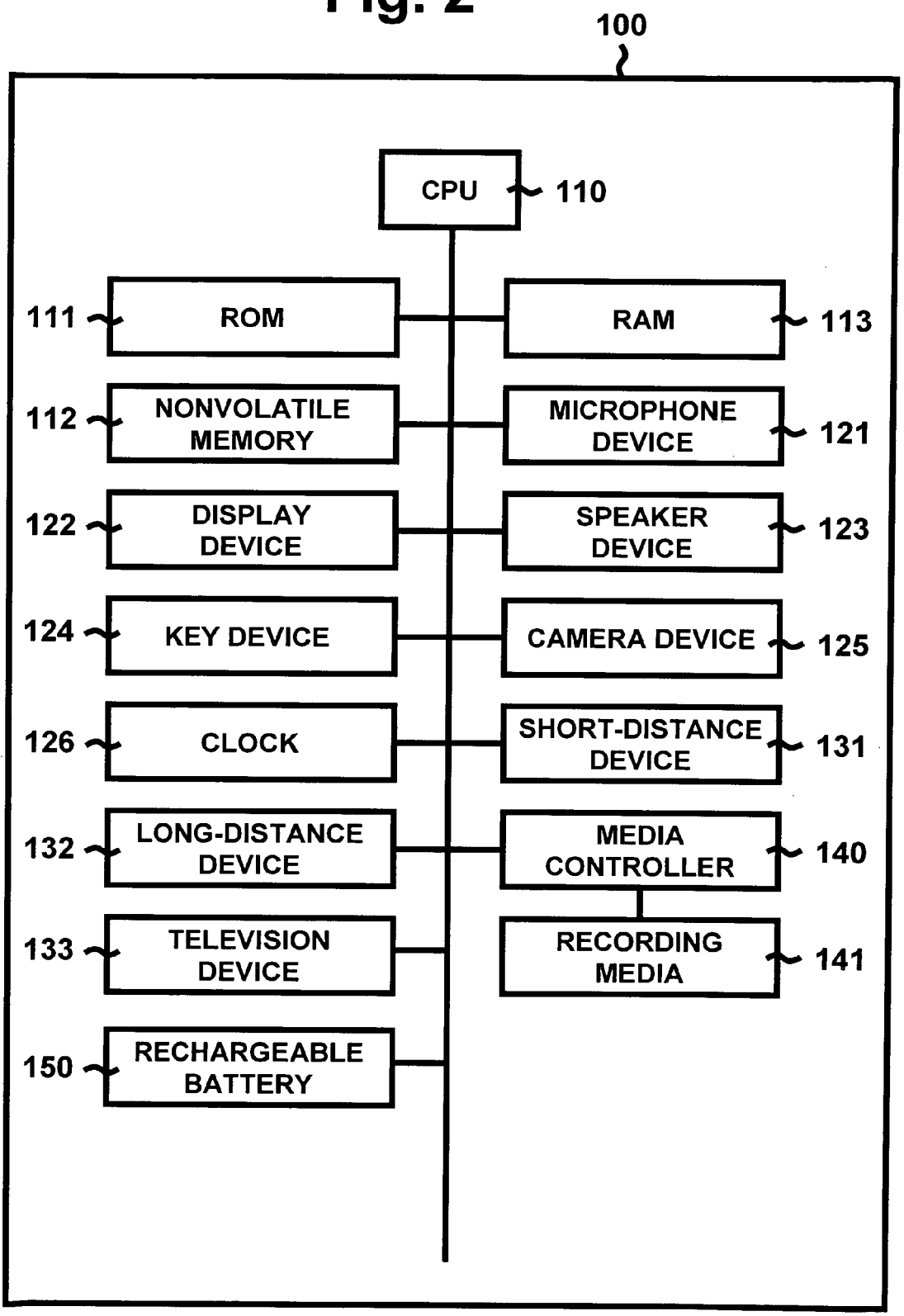
FIG. 2 is an internal block diagram of the mobile phone according to an embodiment of the present invention.

FIG. 2 is an internal block diagram of the mobile phone.

FIG. 2 shows a CPU 110, ROM 111, nonvolatile memory 112, RAM 113, microphone device 121, display device 122, speaker device 123, key device 124, camera device 125, clock 126, short-distance device 131, long-distance device 132, television device 133, media controller 140, and rechargeable battery 150. These are connected to one another via busses.

The CPU 110 has a function of executing various programs, and exerts control over the entire mobile phone.

The ROM 111 stores various programs to be executed by the CPU 110, and various constants necessary for executing these various programs. The CPU 110 executes the programs stored in the ROM 111 using the RAM 113 as a work area.

The nonvolatile memory 112 records various pieces of information, such as an address book or received electronic mails, to be possibly rewritten.

The microphone device 121 is a functional block comprising a microphone for picking up voices of the user, and the processing of the voices picked up by the microphone.

The speaker device 123 is a functional block comprising a speaker for outputting voices to the user, and the producing of vocal signals for driving the speaker.

The camera device 125 is a block governing the collection of image data by photographing, the display device 122 is a block governing the display of images on the liquid crystal panel 101 (refer to FIG. 1), the key device 124 is a block for detecting various key-operations by the user, and the clock 126 is a block for acquiring a current time.

The media controller 140 is a block for reading data from a loaded recording media 141 or writing image data and the like produced by the camera device 125 into the recording media 141.

The short-distance device 131 is a block for transmitting images, telephone numbers and the like to an external device at a short distance, by infrared communications without interposition of a base station (not shown).

The long-distance device 132 is a block for performing talking or the exchange of electronic mails via a base station (not shown).

The television device 133 is a block for converting electronic waves received by an antenna into digital program data by a tuner, and causing the liquid crystal panel 101 (refer to FIG. 1) to display programs expressed by the program data.

The mobile phone according to the present embodiment has basically the above-described constructions.

Next, the upper casing 100A, lower casing 100B, and intermediate casing 100C will be each explained in a more detailed manner. Hereinafter, in a state where the upper casing 100A and intermediate casing 100C are opened with respect to the lower casing 100B, the side on which the liquid crystal panel 101 is provided is referred to as the "surface" side, and the back of the side on which the liquid crystal panel 101 is provided is referred to as the "back" side.

Figure 3:
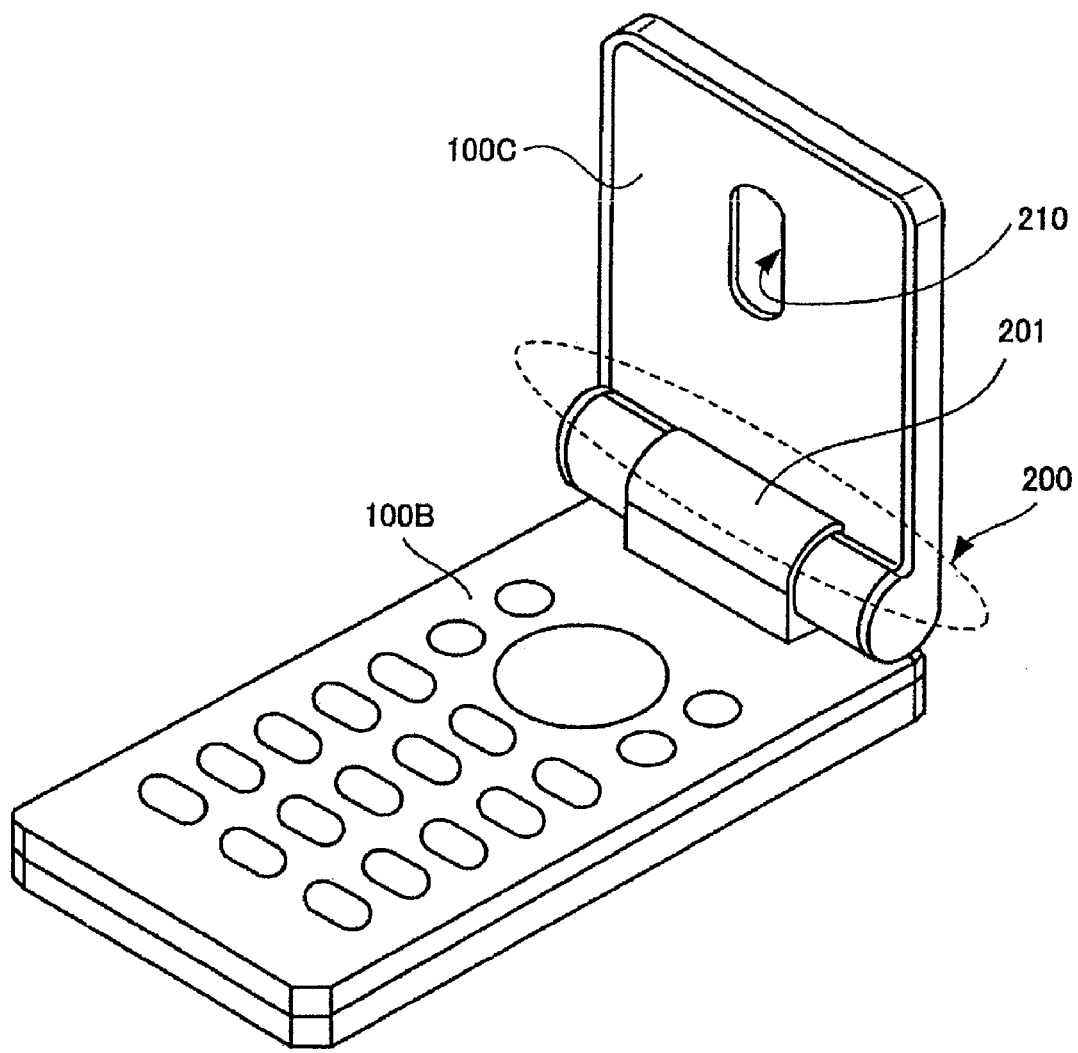
FIG. 3 is a diagram showing the surface sides of a lower casing and an intermediate casing, with an upper casing removed according to an embodiment of the present invention.
Figure 4:
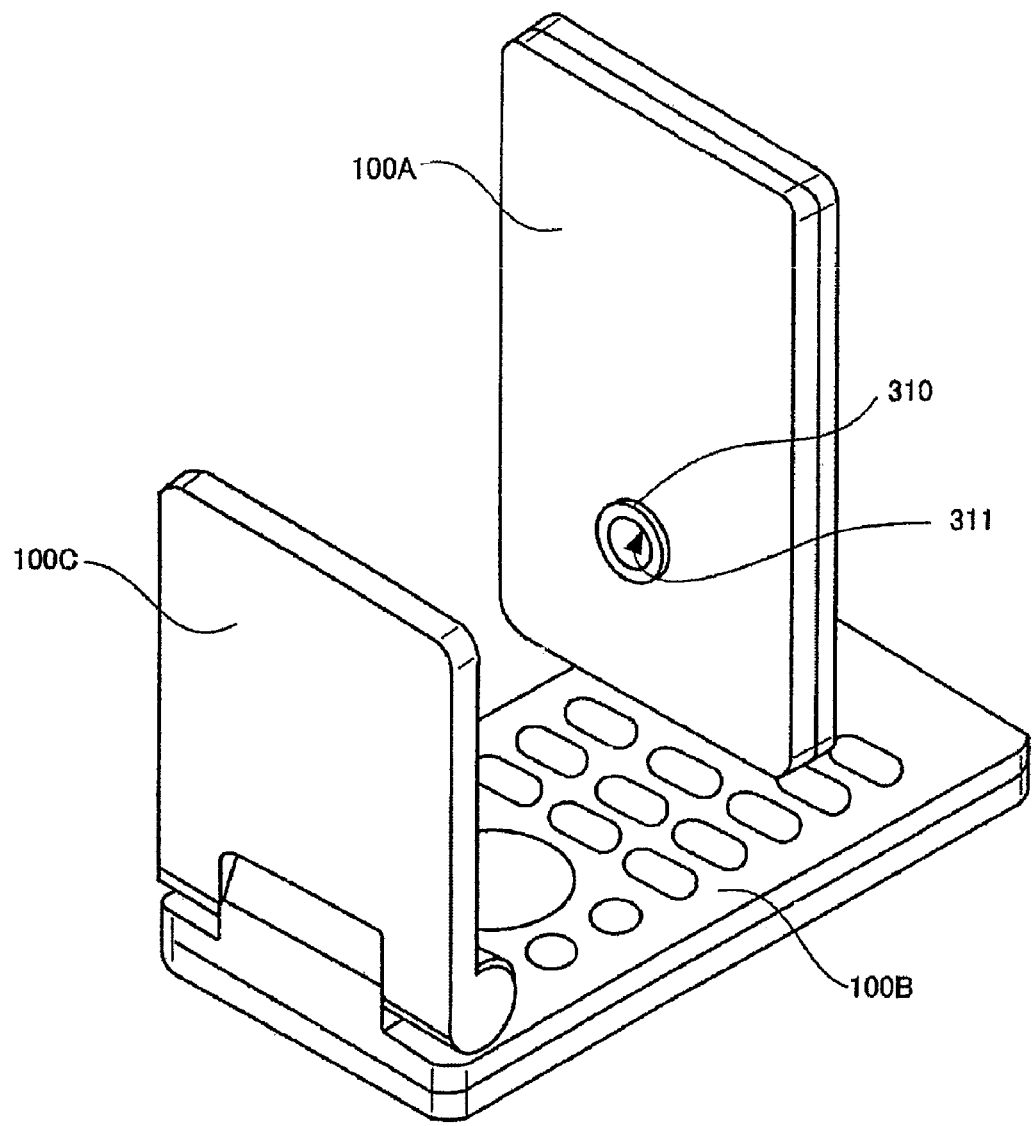
FIG. 4 is a diagram showing the back surface side of the upper casing according to an embodiment of the present invention.

FIG. 3 is a diagram showing the surface side of each of the lower casing 100B and the intermediate casing 100C, with the upper casing 100A removed, and FIG. 4 is a diagram showing the back surface side of the upper casing 100A.

As shown in FIG. 3, the lower casing 100B and the intermediate casing 100C are connected so as to be foldable in the hinge portion 200. The hinge portion 200 has an abutting mount 201 against which the upper casing 100A is abutted. On the surface side of the intermediate casing 100C, there is provided a longitudinal groove 210 extending in the vertical direction. The hinge portion 200 is one example of what the present invention terms "hinge portion". The longitudinal groove 210 is one example of what the present invention terms "vertical groove". The abutting mount 201 is one example of what the present invention terms "guide", as well as one example of what the present invention terms "pillow". In this embodiment example, the intermediate casing 100C is one example of what the present invention terms "first casing".

As shown in FIG. 4, on the back surface side of the upper casing 100A, there is provided a hollow protrusion 310 having therein a through-hole 311. The protrusion 310 is one example of what the present invention terms "protrusion". In this embodiment example, the upper casing 100A is one example of what the present invention terms "second casing".

Fitting the protrusion 310 (FIG. 4) of the upper casing 100A into the longitudinal groove 210 (FIG. 3) of the intermediate casing 100C allows the upper casing 100A to be turnably supported by the intermediate casing 100C.

Figure 5:
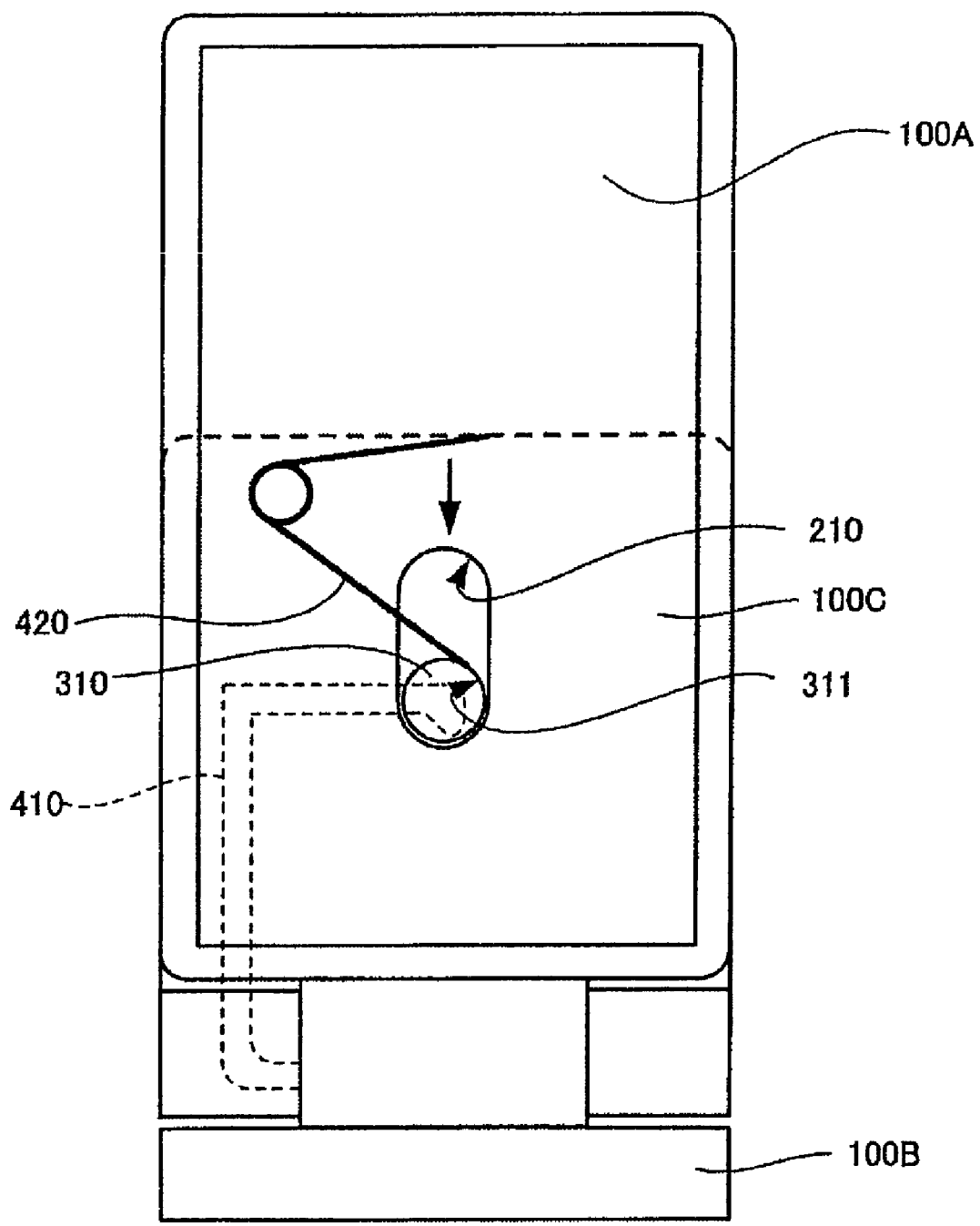
FIG. 5 is a perspective diagram of the upper casing, the lower casing, and the intermediate casing according to an embodiment of the present invention.

FIG. 5 is a perspective diagram of the mobile phone.

As shown in FIG. 5, the protrusion 310 of the upper casing 100A has gotten into the longitudinal groove 210 of the intermediate casing 100C. An electrical cable 410 for electrically connecting the upper casing 100A and the lower casing 100B is arranged through the through-hole 311 in the protrusion 310. The electrical cable 410 is one example of what the present invention terms "electrical cable".

The CPU 110 shown in FIG. 2 is disposed in the lower casing 100B, while the speaker device 123, the camera device 125, the display device 122 and the like are disposed in the upper casing 10A. Therefore, the upper casing 100A and the lower casing 100B must be electrically connected in order to exchange instructions and various pieces of data between the CPU 110 and various components. In the mobile phone according to this embodiment, passing the electrical cable 410 through the through-hole 311 in the protrusion 310 prevents the complication of wiring. This allows the electrical cable to be short, and to be inhibited from the breaking.

This mobile phone also has a spring 420 for resiliently urging downward the upper casing 100A toward the lower casing 100B. The spring 420 is one example of what the present invention terms "resiliently-urging member".

Figure 6:
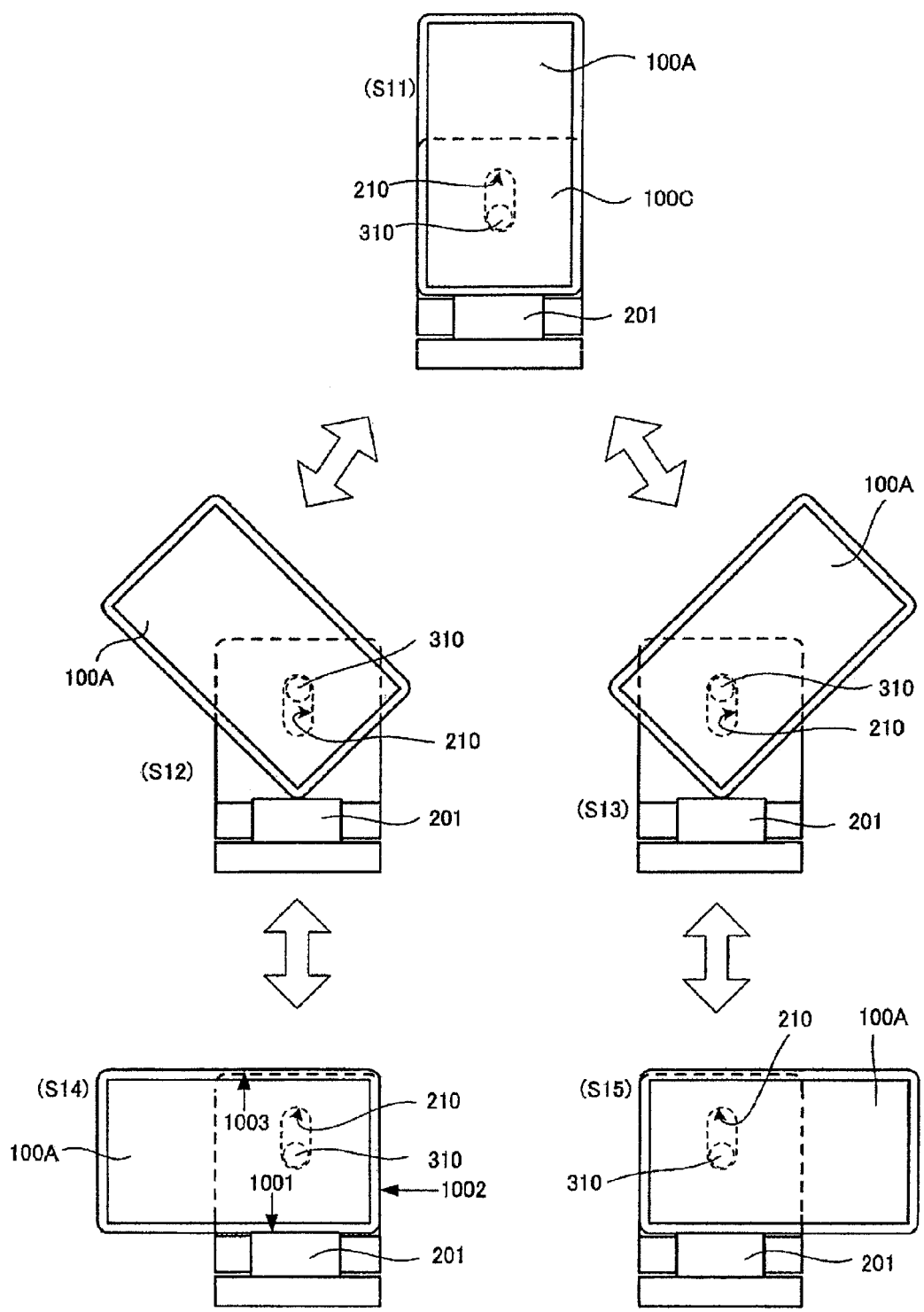
FIG. 6 is a diagram showing operations for inclining the upper casing toward the lower casing according to an embodiment of the present invention.

FIG. 6 is a diagram showing operations for inclining the upper casing toward the lower casing.

In FIG. 6, the electrical cable 410 and the spring 420 and the like shown in FIG. 5 are omitted from illustration in order to make the figure easily viewable.

In the upright state, in which the upper casing 100A is not inclined toward the lower casing 100B (step S11 in FIG. 6), the spring 420 shown in FIG. 5 resiliently urges downward the upper casing 100A toward the lower casing 100B, and the upper casing 100A is maintained in a longitudinal posture with respect to the lower casing 100B. Also, the lower side of the upper casing 100A is abutted against the abutting mount 201 to thereby reduce wobbling of the upper casing 100A.

In this embodiment, in the upright state shown in step S11 in FIG. 6, it is designed that the width of the upper casing 100A and that of the intermediate casing 100C conform to each other and that the protrusion 310 is located at the lowest position of the longitudinal groove 210.

When the upper casing 100A is inclined toward the left side, the protrusion 310 moves upward under the guidance of the longitudinal groove 210 to thereby rotate the upper casing 100A (step S12 in FIG. 6). At first, by the spring 420 shown in FIG. 5, the upper casing 100A is resiliently urged toward the direction in which it is maintained in the upright state (step S11 in FIG. 6). However, when the upper casing 100A is further inclined against the resiliently urging force, the upper casing 100A is resiliently urged toward the same direction as the rotational direction from the time when the upper casing 100A is inclined by an angle of about 45 degrees. As a result, the bottom left corner of the upper casing 100A is guided by the abutting mount 201, as well as the protrusion 310 moves downward under the guidance of the longitudinal groove 210, whereby the upper casing 100A rotates (step S12 in FIG. 6), and is felled sidelong toward the left side with respect to the lower casing 100B (step S13 in FIG. 6).

In the leftward felled-sidelong state shown in step S13, the face 1001 of the upper casing 100A, opposite to the lower casing 100B is abutted against the abutting mount 201, and further the upper casing 100A is resiliently urged downward by the spring 420 so as to maintain its leftward felled-sidelong state, thereby reducing wobbling in the leftward felled-sidelong state. Also, in the leftward felled-sidelong state, the right edge 1002 of the upper casing 100A is flush with the right edge of the intermediate casing 100C, and further the upper edge 1003 of the upper casing 100A is flush with the upper edge of the intermediate casing 100C.

Next, when the user rotates the upper casing 100A in the right direction from the leftward felled-sidelong state (step S13 in FIG. 6), the upper casing 10A, at first, is resiliently urged by the spring 420 shown in FIG. 5 in the direction in which the upper casing 100A is maintained in the leftward felled-sidelong state. However, as the upper casing 100A gets close to the upright state, it is resiliently urged in the same direction as the rotational direction. As a result, the upper casing 100A rotates while being guided by the abutting mount 201, and thus returns to the upright state.

On the other hand, when the user inclines the upper casing 100A from the upright state (step S11 in FIG. 6) in the right direction (step S14 in FIG. 6), the protrusion 310 of the upper casing 100A is guided by the longitudinal groove 210, as well as the bottom right corner of the upper casing 100A is guided by the abutting mount 201, whereby the upper casing 100A is felled sidelong toward the right side with respect to the lower casing 100B (step S15 in FIG. 6).

As described above, according to the mobile phone of the present invention, it is possible to easily incline the upper casing 100A leftward and rightward with respect to lower casing 100B, without providing a large curve to each of the lower corners of the upper casing 100A. This allows the upper casing 100A to have a large liquid crystal panel 101, which makes it possible to browse an image by displaying it in a large size while maintaining the holdability of the mobile phone.

Next, a second embodiment according to the present invention will be described. Because the second embodiment has the same construction as that of the first embodiment except that a longitudinal groove 210 in the intermediate casing 100C in the second embodiment is different in length from that in the first embodiment. Therefore, in this embodiment, the same components as those in the first embodiment are designated by the same symbols, and description thereof is omitted. Only differences of the second embodiment from the first embodiment are described.

Figure 7:
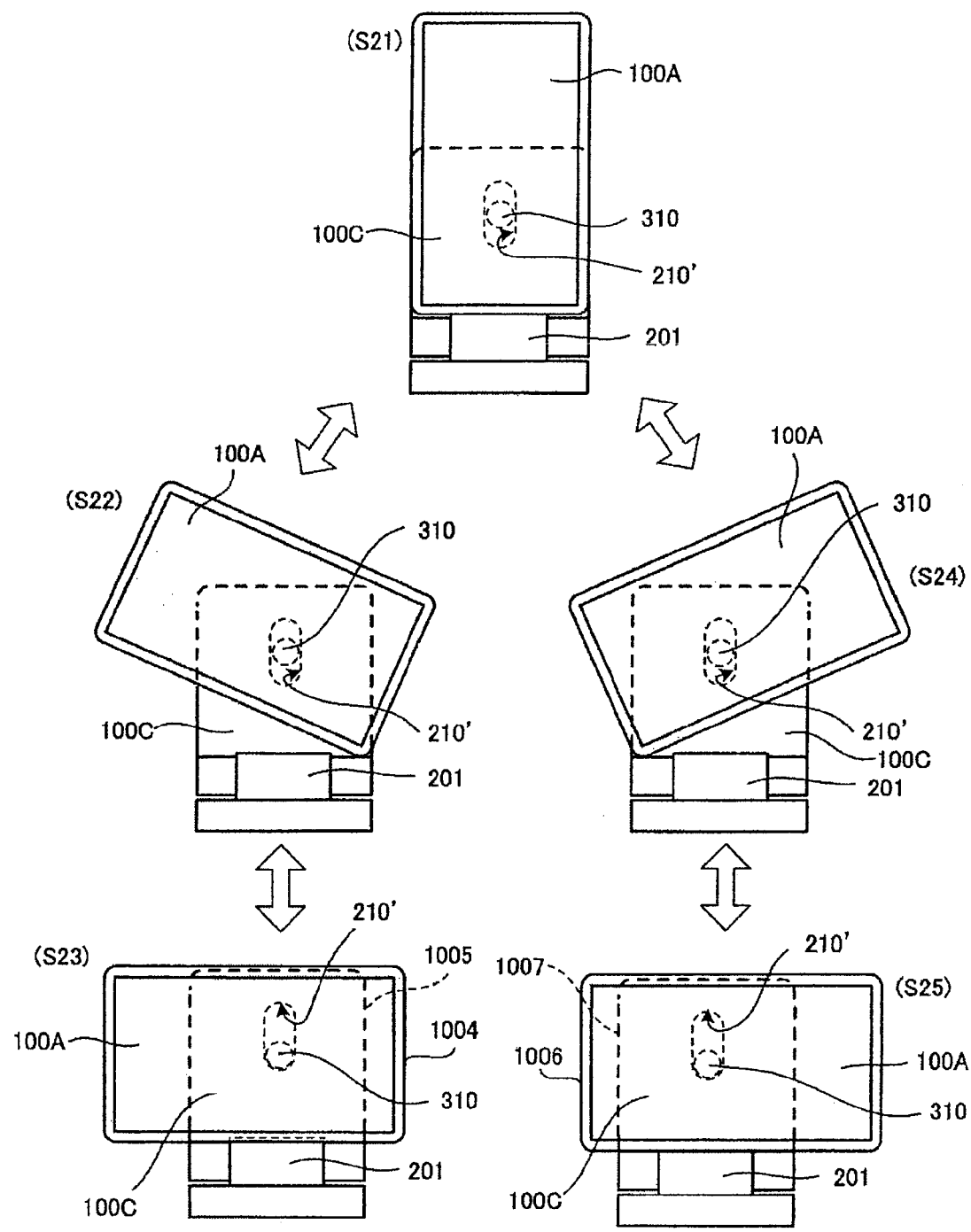
FIG. 7 is a diagram showing operations for inclining the upper casing toward the lower casing, in a mobile phone according to a second embodiment of the present invention.

FIG. 7 is a diagram showing operations for inclining the upper casing toward the lower casing, in a mobile phone according to the present embodiment.

The mobile phone according to this embodiment has substantially the same construction as that according to the first embodiment shown in FIG. 6, but a longitudinal groove 210' is longer than the longitudinal groove 210 in the first embodiment, and the protrusion 310 is designed to come to an intermediate position of the longitudinal groove 210' in the upright state shown in step S21 in FIG. 7.

When the upper casing 100A is inclined toward the left side (step S22 in FIG. 7), as in the case of the first embodiment, the upper casing 100A is resiliently urged downward by the spring 420 shown in FIG. 5, the protrusion 310 is guided by the longitudinal groove 210' and the bottom left corner of the upper casing 100A is guided by the abutting mount 201 and the like.

In the leftward felled-sidelong state in which the upper casing 100A has been felled sidelong toward the left side with respect to the lower casing 100B (step S23 in FIG. 7), the right edge 1004 of the upper casing 100A does not become flush with the right edge 1005 of the intermediate casing 100C, and the entire upper casing 100A is brought close to the center, differently from the leftward felled-sidelong state in the first embodiment (step S13 in FIG. 6).

Also, when the upper casing 100A is inclined (step S24 in FIG. 7) and has been completely felled sidelong toward the right side with respect to the lower casing 100B (step S25 in FIG. 7), the left edge 1006 of the upper casing 100A does not become flush with the left edge 1007 of the intermediate casing 100C, and the upper casing 100A is brought close to the center.

In this manner, bringing the entire upper casing 100A close to the center when the upper casing 100A is inclined into leftward felled-sidelong state and rightward felled-sidelong state, allows an improvement in a feeling of stability when the mobile phone is held in a hand.

A third embodiment according to the present invention will now be described. Because the third embodiment has the same construction as that of the first embodiment except that the shape of a hinge portion 200 in the third embodiment is different from that in the first embodiment, only differences of the third embodiment from the first embodiment are described.

FIGS. 8A and 8B, respectively, are a front view and a side view of the upper casing 100A and the intermediate casing 100C in the mobile phone according to this embodiment, and FIG. 9 is an oblique perspective view of the upper casing 100A and the intermediate casing 100C in the mobile phone according to this embodiment.

As shown in FIGS. 8A and 8B, in this embodiment, a dent portion 520 is provided at each of the left and right ends of the hinge portion 200 in the intermediate casing 100C. The dent portion is one example of what the present invention call "recess portion".

As shown in FIG. 9, the dent portion 520 is a spacing provided between the upper casing 100A and the abutting mount 201. As described above, when the upper casing 100A is inclined by about 45 degrees with respect to the lower casing 100B, the upper casing 100A automatically rotates up to the leftward felled-sidelong state and the rightward felled-sidelong state under the resiliently urging force of the spring 420 shown in FIG. 5. Therefore, the user can easily fell the upper casing 100A sideways only by holding the mobile phone in one hand, entering fingertips into the dent portions 520, and pushing up the upper casing 100A.

Next, a fourth embodiment according to the present invention will be described. In the fourth embodiment also, the same components as those in the first embodiment are designated by the same symbols, and description thereof is omitted. Only differences of the fourth embodiment from the first embodiment are described.

Figure 10A:
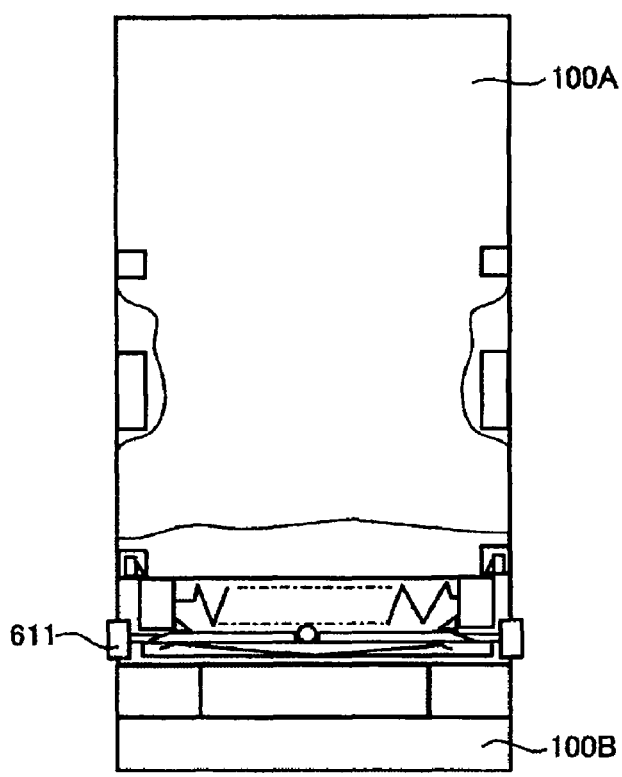
FIGS. 10A and 10B are perspective diagrams each showing a mobile phone according to a fourth embodiment of the present invention.
Figure 10B:
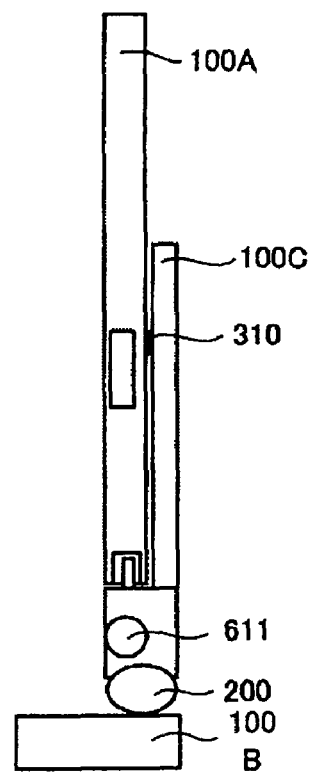
Figure 13A:
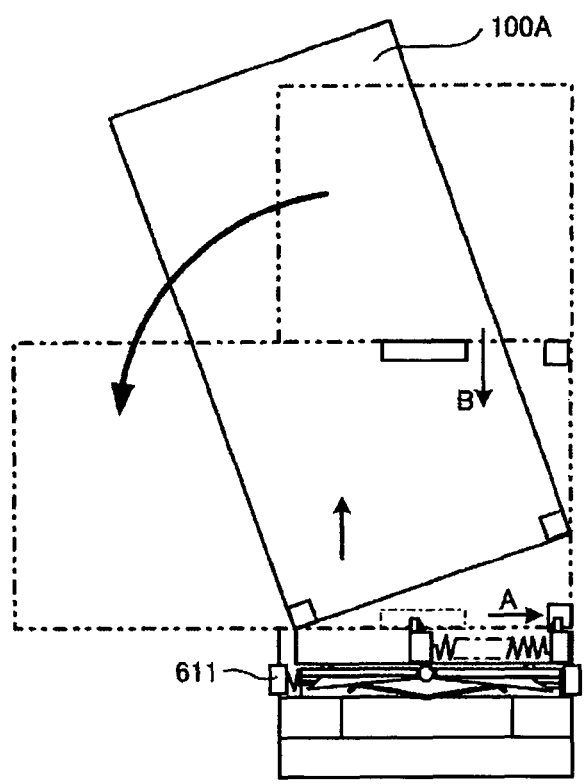
FIGS. 13A and 13B are diagrams each showing a rotational operation of the upper casing.
Figure 13B:
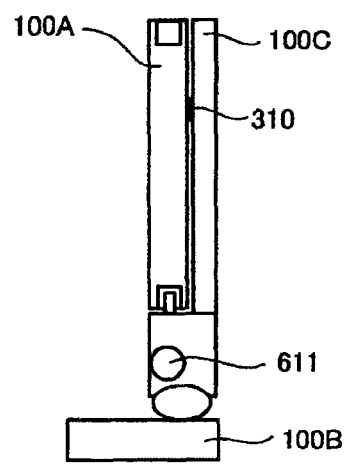
Figure 14A:
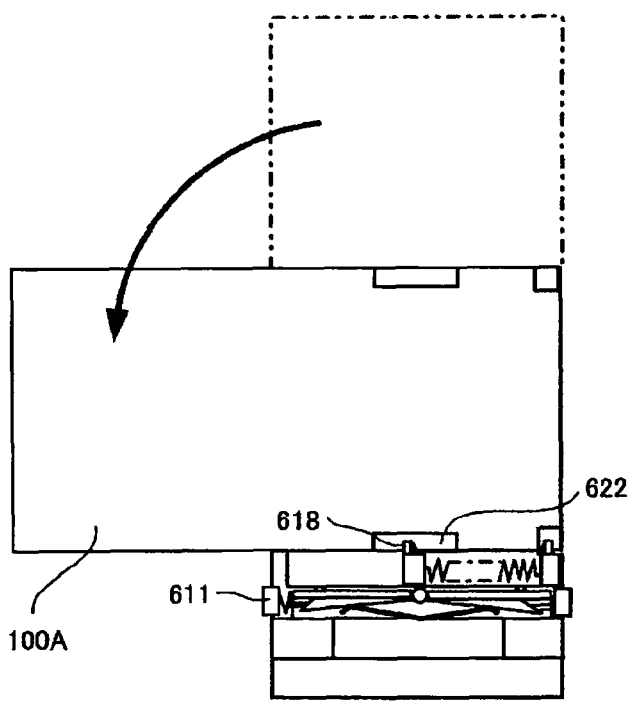
FIGS. 14A and 14B are diagrams each showing an operation when the one of the buttons is pushed.
Figure 14B:
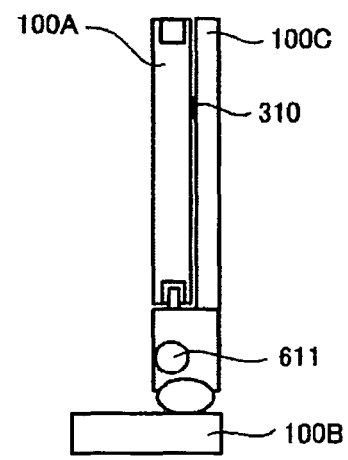

FIGS. 10A and 10B are perspective diagrams each showing a mobile phone according to this embodiment.

FIG. 10A is a perspective diagram of the mobile phone as seen from the front thereof, and FIG. 10B is its perspective diagram as seen from the side thereof.

As in the case of the mobile phone according to the first embodiment shown in FIG. 5, in the mobile phone according to this embodiment shown in FIGS. 10A and 10B, the upper casing 100A is resiliently urged downward by the spring 420, and the upper casing 100A is rotatably supported by the intermediate casing 100C by the protrusion 310 of the upper casing 100A getting into the longitudinal groove 210 provided in the intermediate casing 100C. Also, in the mobile phone according to this embodiment, by the user pushing one of buttons 611 provided at the left and right ends, the upper casing 100A rotates in a respective one of the left and right directions.

FIGS. 11A to 11C are enlarged diagrams each showing the vicinity of the buttons 611 in the mobile phone, shown in FIG. 10.

FIG. 11A is a side view showing the vicinity of the buttons 611 in the mobile phone, FIG. 11B is a perspective diagram of the vicinity of the buttons 611 as viewed from the front thereof, and FIG. 11C is a sectional view of the vicinity of the buttons 611 as viewed from the side thereof. Meanwhile, the mobile phone according to this embodiment has a left-side component for inclining the upper casing 100A toward the left side and a right-side component for inclining the upper casing 100A toward the right side. However, because the left-side component and the right-side component have the same construction, only the left-side component is hereinafter described as a representative of them.

The intermediate casing 100C includes a button claw 613 that extends from the button 611, a button spring 612 that pulls the button claw 613 toward the button 611, a lever 614 that rotates downward about a shaft 616 by being pushed by the button claw 613, a leaf spring 615 that resiliently urges upward the lever 614, a lock claw 617 attached to the front end of the lever 614, a moving claw 618 that is inhibited from its movement by the lock claw 617, and a pulling spring 619 that pulls the moving claw 618 in the direction of the shaft 616. The upper casing 100A includes an erection hole 621 into which the moving claw 618 is fitted when the upper casing 100A is in the upright state, and a falling-sidelong hole 622 into which the moving claw 618 is fitted when the upper casing 100A is in the leftward felled-sidelong state.

In a state where the button 611 has not yet been pushed, the moving claw 618 is kept pulled by the pulling spring 619 in the direction of the shaft 616 (the right direction in FIG. 11B), but the moving claw 618 is inhibited from moving by being locked by the lock claw 617 and further by being fitted into the erection hole 621 of the upper casing 100A. The upper casing 100A is maintained in the upright state by being resiliently urged downward by the spring 420 shown in FIG. 5.

FIGS. 12A and 12B are diagrams showing an operation when the button 611 is pushed, and FIGS. 13A and 13B, and FIGS. 14A and 14B are diagrams showing a rotational operation of the upper casing 10A.

When the user pushes the button 611, as shown in FIG. 12, the lever 614 is rotated downward about the shaft 616 by the lever 614 being pushed by the button claw 613, and the lock claw 617 gets down, whereby the lock that has inhibited the moving claw 618 is released. Upon release of the lock, the moving claw 618 is pulled by the pulling spring 619 in the right direction, in a state of being fitted in the erection hole 621 of the upper casing 100A. As a result, as shown in FIG. 13, a pulling force A by the pulling spring 619 outweighs a resiliently urging force B by the spring 420 (refer to FIG. 5), in the direction in which the upright state is maintained (refer to FIG. 5), whereby the upper casing 100A is rotated leftward while the protrusion 310 is guided by the longitudinal groove 210 to thereby move upward.

Here, since the lever 614 shown in FIG. 12 is resiliently urged upward by the leaf spring 615, the lever 614 is moved downward by the button 611 being pushed, thereby releasing the lock. Thus, when the moving claw 618 gets over the lock claw 617, the lever 614 is moved upward, and the button 611 is returned to the original state.

When the upper casing 100A is rotated by about 45 degrees, the moving claw 618 shown in FIG. 12 is displaced from the erection hole 621 of the upper casing 10A, and loses its force for pulling the upper casing 100A in the right direction. However, as shown in FIG. 14, the spring 420 (refer to FIG. 5) resiliently urges the upper casing 100A in the downward direction, which is the same as the rotational direction, and rotates the upper casing 100A up to the leftward felled-sidelong state. When the upper casing 100A is rotated up to the leftward felled-sidelong state, the moving claw 618 is fitted into the falling-sidelong hole 622 of the upper casing 100A, thus inhibiting the movement of the upper casing 100A.

In this way, according to this embodiment, the user can easily incline the upper casing 100A only by pushing the button 611.

When attempting to return the upper casing 100A from the leftward felled-sidelong state to the upright state, the user should slide upward the upper casing 100A and then rotate it in the right direction. Thereupon, the moving claw 618 is displaced from the falling-sidelong hole 622 of the upper casing 100A to thereby be moved leftward against a pulling force by the pulling spring 619, and in the upright state, the moving claw 618 is fitted into the erection hole 621.

A fifth embodiment according to the present invention will now be described. Because the fifth embodiment has the same construction as that of the first embodiment except that, in the fifth embodiment, motors and the like for automatically inclining the upper casing 100A are provided in the upper casing 100A and the lower casing 100B, only differences of the fifth embodiment from the first embodiment are described.

Figure 15A:
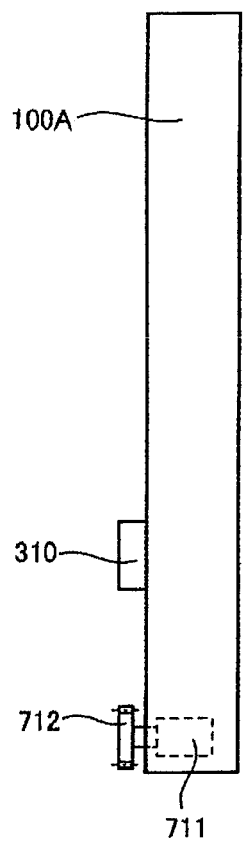
FIGS. 15A and 15B are diagrams each showing the upper casing in a mobile phone according to a fifth embodiment of the present invention.
Figure 15B:
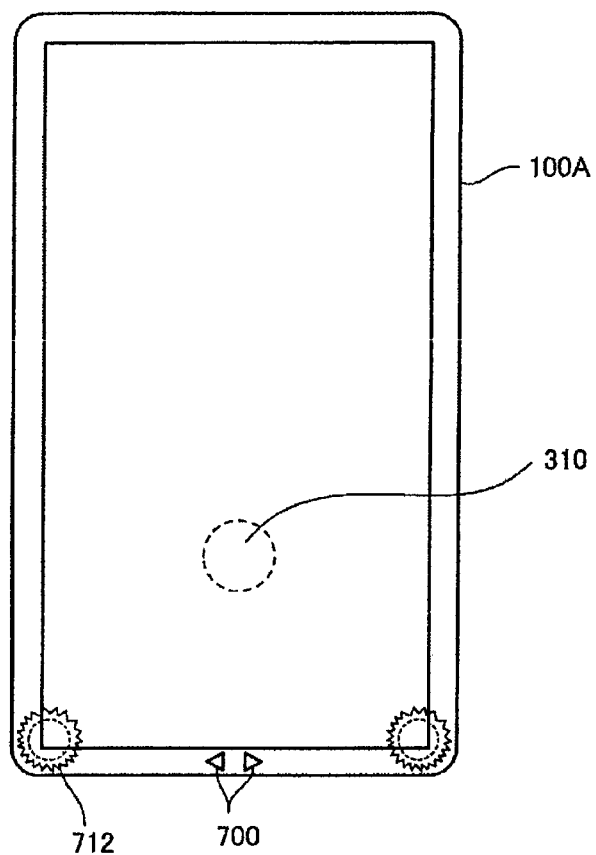
Figure 16:
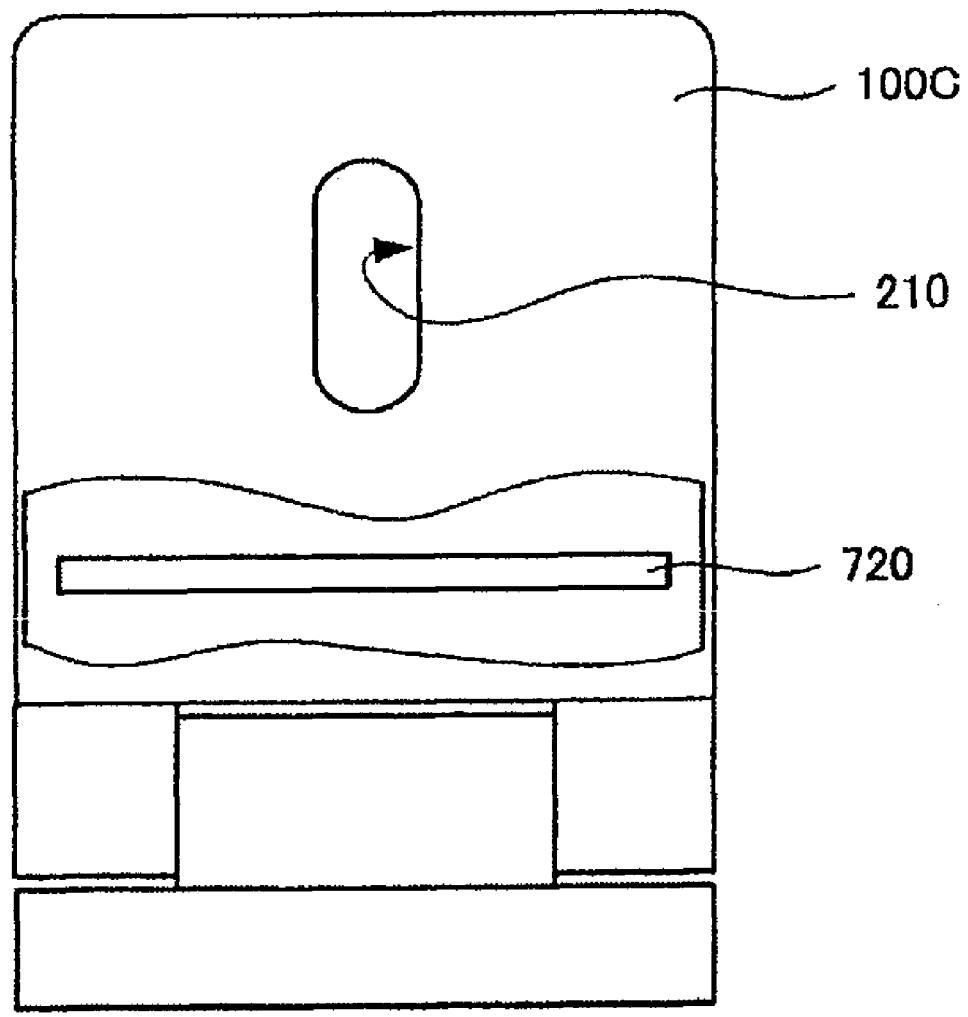
FIG. 16 is a diagram showing the intermediate casing in the mobile phone.

FIGS. 15A and 15B are diagrams each showing the upper casing in the mobile phone according to this embodiment, and FIG. 16 is a diagram showing the intermediate casing in the mobile phone according to this embodiment.

As shown in FIGS. 15A and 15B, the mobile phone according to this embodiment has the same protrusion 310 as that in the first embodiment shown in FIG. 4, and further includes, on the lower side of the upper casing 100A, pinion gears 712, motors 711 for rotationally driving the pinion gears 712, and inclination buttons 700 for inclining the upper casing 100A to respective left and right directions.

Also, as shown in FIG. 16, the mobile phone according to this embodiment includes the same longitudinal groove 210 as that in the first embodiment shown in FIG. 3, and a rack gear 720 with which the two pinion gears mesh.

Figure 17:
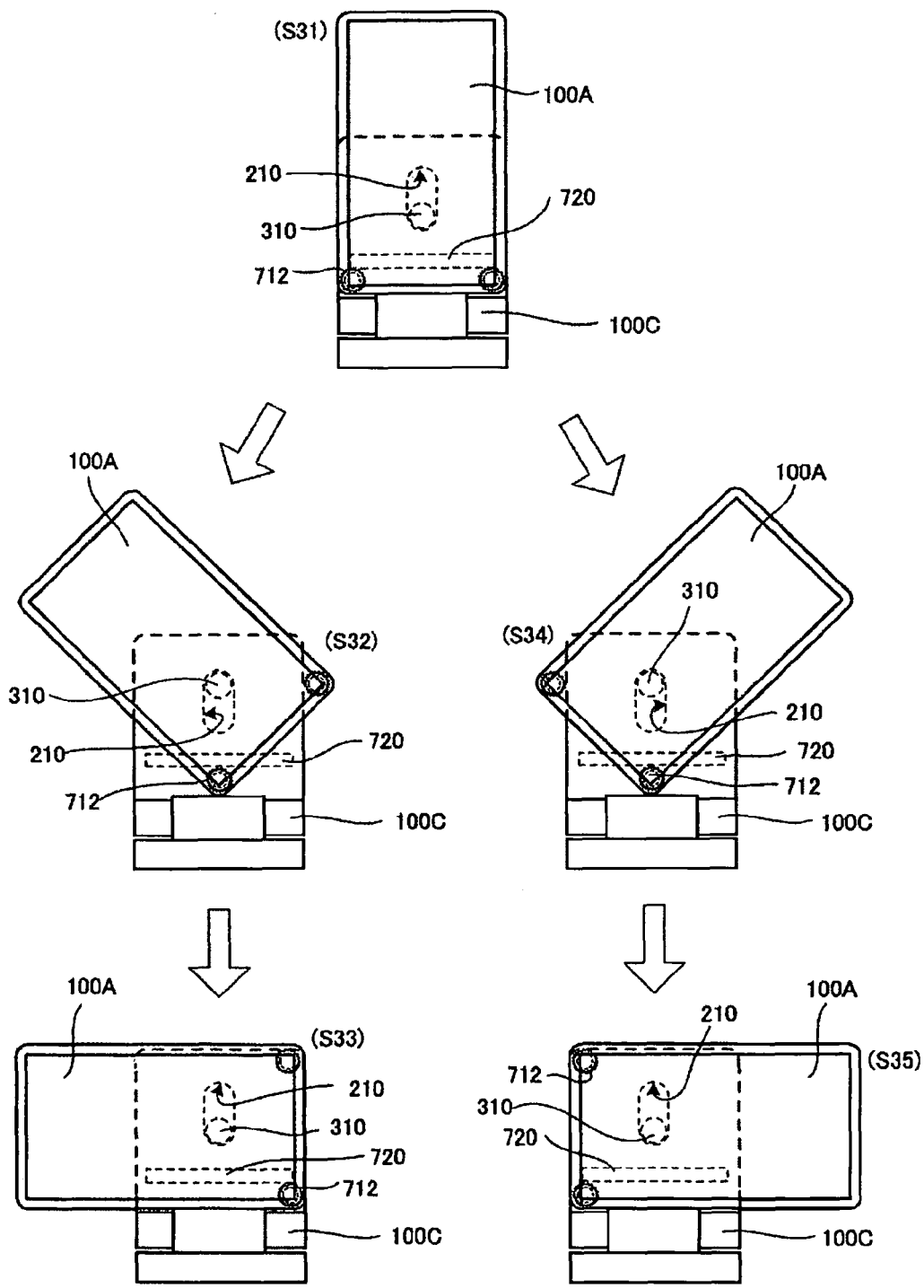
FIG. 17 is a diagram showing operations for inclining the upper casing toward the lower casing.

FIG. 17 is a diagram showing operations for inclining the upper casing 100A toward the lower casing 100B, in the mobile phone according to this embodiment.

In this embodiment, in the upright state of the upper casing 100A (step S31 in FIG. 17), the protrusion 310 is disposed at the lowest position of the longitudinal groove 210, and the two pinion gears 712 provided in the upper casing 100A is in a meshing engagement with the rack gear 720 provided in the intermediate casing 100C.

When the user pushes the inclination button 700 for inclining the upper casing 100A toward the left side, a drive instruction is issued from the CPU 110 to the motor 711, and the motor 711 is rotationally driven in the right direction. As a result, the two pinion gears 712 are rotated and moved along the rack gear 720 in the right direction, and after the right pinion gear 712 has been displaced from the rack gear 720, the protrusion 310 is guided by the longitudinal groove 210, as well as the left pinion gear 712 is guided by the longitudinal groove 210, thereby rotating the upper casing 100A in the left direction (step S32 in FIG. 17).

When the upper casing 100A is inclined in the left direction, the upper casing 100A is abutted against the abutting mount 201, and the movement of the pinion gear 712 is stopped (step S33 in FIG. 17).

When the user pushes the inclination button 700 for inclining the upper casing 100A toward the right side, the motor 711 is rotationally driven in the left direction. As a result, the two pinion gears 712 are moved in the left direction, and after the left pinion gear 712 has been displaced from the rack gear 720, the upper casing 100A is rotated in the right direction (step S34 in FIG. 17). When the upper casing 100A is inclined up to the rightward felled-sidelong state, the movement of the pinion gear 712 is stopped (step S35 in FIG. 17).

As described above, according to the mobile phone of this embodiment, the user can easily incline the upper casing 100A only by pushing the button 611, without applying a large force.

Next, a sixth embodiment according to the present invention will be described. In the sixth embodiment also, the same components as those in the first embodiment are designated by the same symbols, and description thereof is omitted. Only differences of the sixth embodiment from the first embodiment are described.

Figure 18:
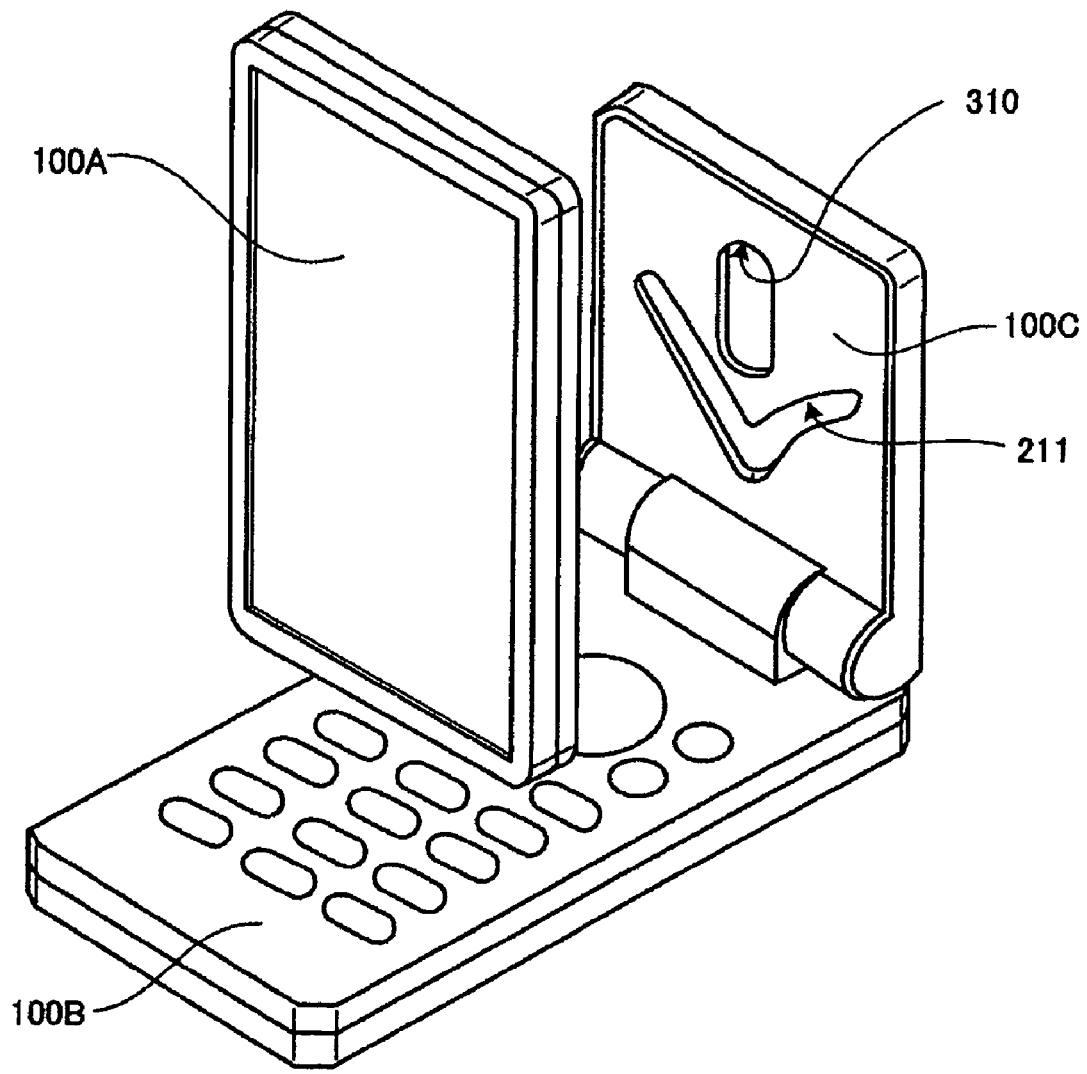
FIG. 18 is a diagram showing the surface side of the intermediate casing in a mobile phone according to a sixth embodiment of the present invention.

FIG. 18 is a diagram showing the surface side of the intermediate casing 100C in the mobile phone according to this embodiment.

As shown in FIG. 18, the intermediate casing 100C according to this embodiment has a longitudinal groove 210 that vertically extends, as in the intermediate casing 100C in the first embodiment, and further, has a V-groove 211 that extends in the left and right directions, formed below the longitudinal groove 210. The V-groove is one example of what the present invention terms "guide groove".

Figure 19:
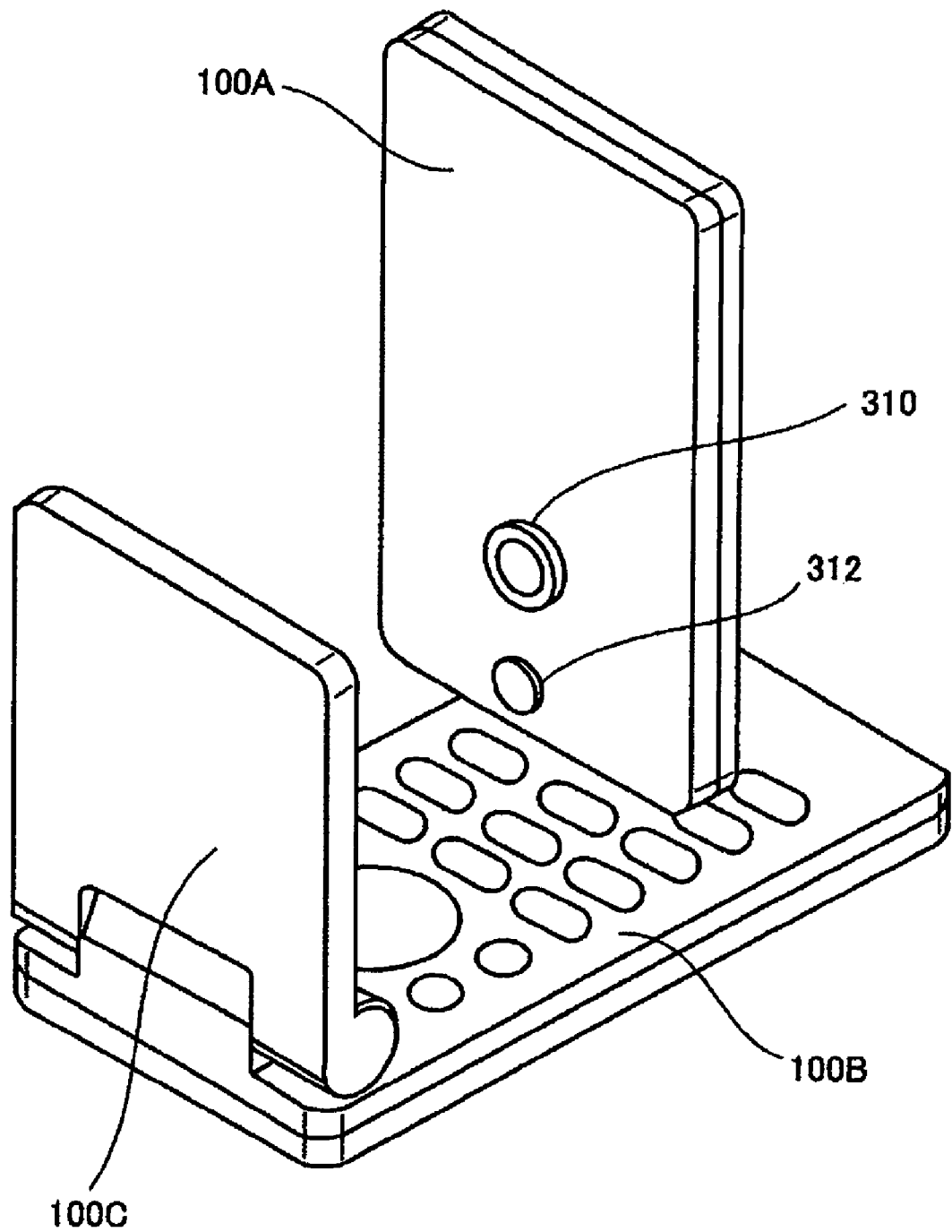
FIG. 19 a diagram showing the back surface side of the upper casing.

FIG. 19 is a diagram showing the back surface side of the upper casing 100A in the mobile phone according to this embodiment.

As shown in FIG. 19, as in the case of the upper casing 100A in the first embodiment shown in FIG. 4, the upper casing 100A has an protrusion 310 to be fitted into the longitudinal groove 210, and further, has an auxiliary protrusion 312 to be fitted into the V-groove 211. The auxiliary protrusion 312 is one example of what the present invention terms "guide pin".

Figure 20:
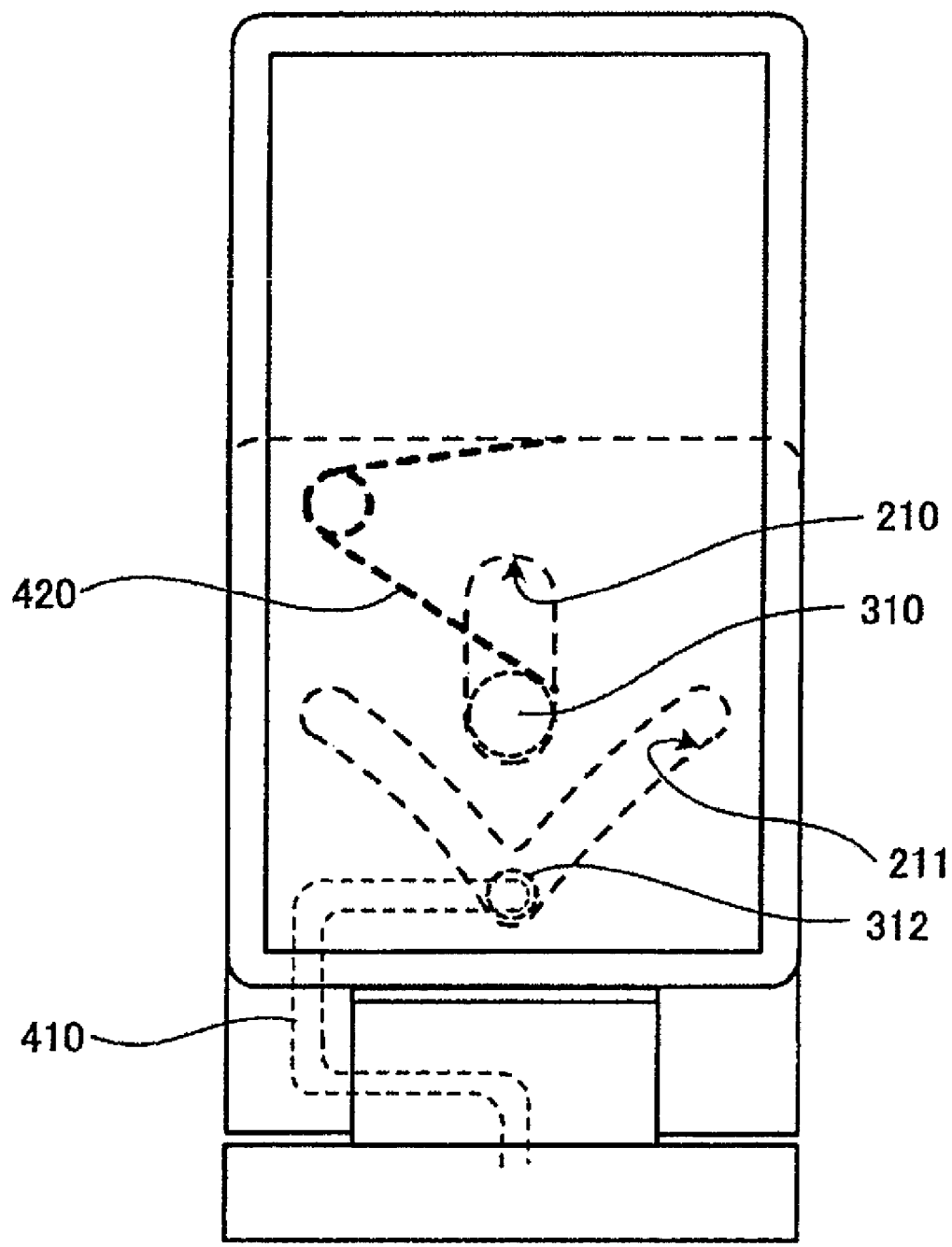
FIG. 20 is a perspective diagram showing the upper casing, the lower casing, and the intermediate casing.

FIG. 20 is a perspective diagram showing the upper casing 100A, the lower casing 100B, and the intermediate casing 100C.

The mobile phone according to the present invention also has a spring 420 that is connected to the protrusion 310 and that resiliently urges the upper casing 100A in the downward direction. Also, in this embodiment, the auxiliary protrusion 312 has a through-hole, and an electrical cable 410 for electrically connecting the upper casing 100A and the lower casing 100B is arranged through the through-hole of the auxiliary protrusion 312. Passing the electrical cable 410 through the through-hole of the auxiliary protrusion 312 allows the prevention of breaking of the electrical cable 410, as well.

FIGS. 21A and 21B are diagrams showing various dimensions in the mobile phone according to this embodiment.

In the mobile phone according to this embodiment, in the leftward felled-sidelong state shown in FIG. 21A, the distance B1 between the right edge of the upper casing 100A and the center of the protrusion 310 is made equal to the distance B2 between the lower edge of the upper casing 100A and the center of the auxiliary protrusion 312, and the distance C1 between the center of the protrusion 310 and the center of the auxiliary protrusion 312 is made equal to the distance C2 between the center of the protrusion 310 and the center of the auxiliary protrusion 312 in the upright state shown in FIG. 20B. Also, in order to smoothly rotate the upper casing 100A, a spacing A is provided between the lower edge of the upper casing 100A and the abutting mount 201. By using the upper casing 100A and intermediate casing 100C with such dimensions, it is possible to bring the right edge of the upper casing 100A in line with that of the intermediate casing 100C, in the leftward felled-sidelong state, and to bring the left edge of the upper casing 100A in line with that of the intermediate casing 100C, in the rightward felled-sidelong state. Furthermore, in both of the leftward felled-sidelong state and rightward felled-sidelong state, it is possible to bring the upper edge of the upper casing 100A in line with that of the intermediate casing 100C.

Figure 22:
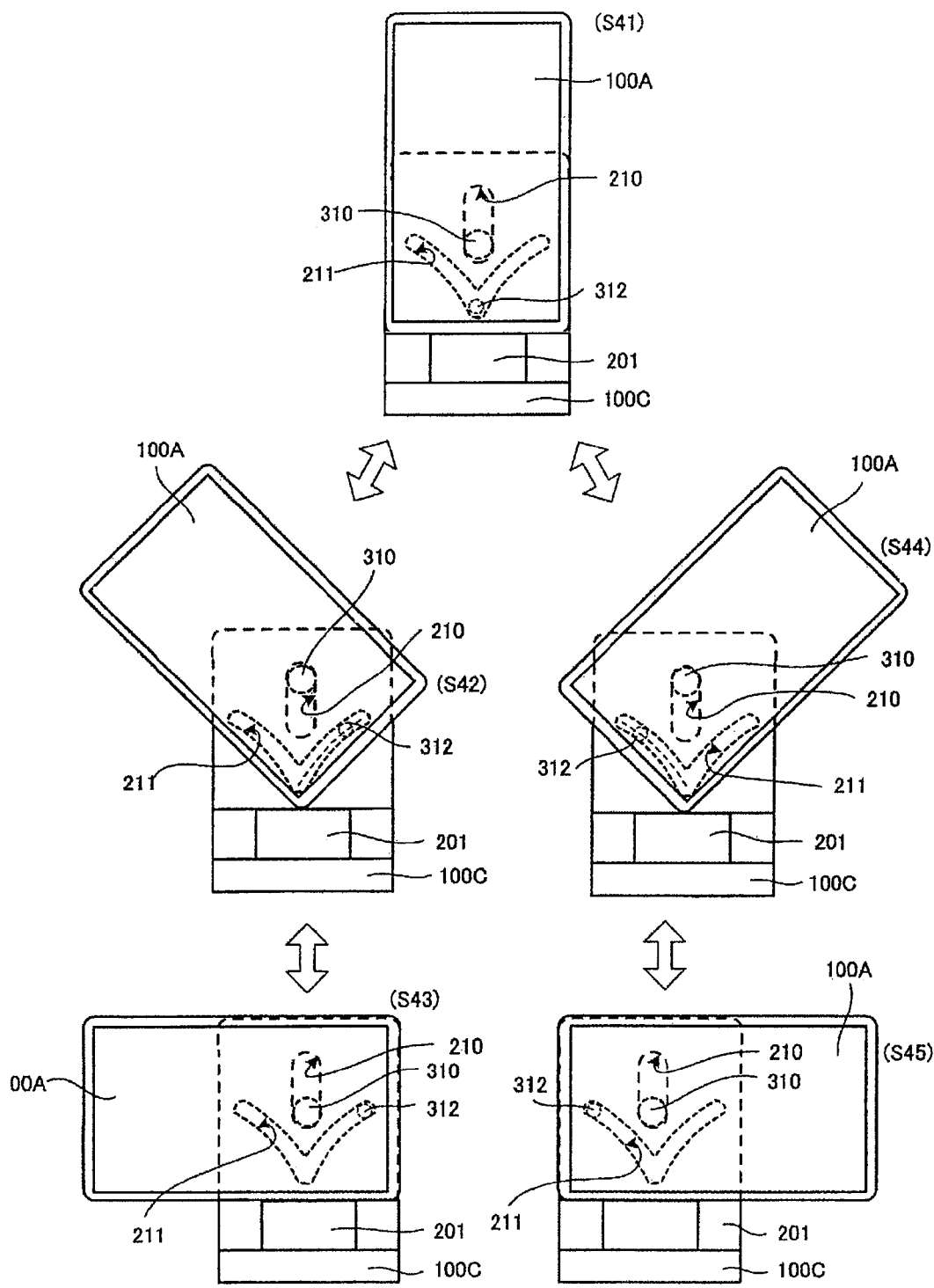
FIG. 22 is a diagram showing operations for inclining the upper casing toward the lower casing.

FIG. 22 is a diagram showing operations for inclining the upper casing 100A toward the lower casing 100B.

As shown in FIG. 21B also, when the upper casing 100A is in the upright state (step 41 in FIG. 22), the protrusion 310 is located at the lowest position of the longitudinal groove 210, and an auxiliary protrusion 313 is located at the lowest position of the V-groove 212.

When the user inclines the upper casing 100A toward the left side, first, the protrusion 310 moves upward under the guidance of the longitudinal groove 210, as well as the auxiliary protrusion 312 moves upward along the right side groove of the V-groove 211, and the upper casing 100A starts rotating in the left direction against the resiliently urging force of the spring 420 (step S42 in FIG. 22).

Upon being rotated by about 45 degrees, the upper casing 100A is resiliently urged by the spring 420 in the same direction as the rotational direction, and the upper casing 100A is rotated while the bottom corner thereof is guided by the abutting mount 201, to thereby be felled sidelong leftward with respect to the lower casing 100B (step 43 in FIG. 22).

On the other hand, when the user inclines the upper casing 100A toward the right side (step 44 in FIG. 22), the protrusion 310 is guided by the longitudinal groove 210 and the auxiliary protrusion 312 is guided by the left side groove of the V-groove 211 and moves along it, whereby the upper casing 100A is rotated in the right direction, and is felled sidelong rightward with respect to the lower casing 100B (step S45 in FIG. 22). Thus providing the V-groove 211 in addition to the longitudinal groove 210 allows the upper casing 100A to be more smoothly inclined.

Next, a seventh embodiment according to the present invention will be described. Because the seventh embodiment has the same construction as that of the sixth embodiment except that the dimension of a longitudinal groove 210 in this embodiment is different from that of the sixth embodiment, only differences of the seventh embodiment from the sixth embodiment are described.

FIGS. 23A and 23B are diagrams showing various dimensions in the mobile phone according to this embodiment of the present invention.

In the mobile phone according to this embodiment, in the leftward felled-sidelong state shown in FIG. 23A, when the distance between the right edge of the intermediate casing 100C and that of the upper casing 100A is represented as β, and the distance between the center of the protrusion 310 and that of the auxiliary protrusion 312 is represented as J, let the distance between the right edge of the upper casing 100A and the center of the protrusion 310 be (H+β), and let the distance between the center of the protrusion 310 and that of the auxiliary protrusion 312 in the upright state shown in FIG. 23B be (J−β). Moreover, in order to smoothly rotate the upper casing 10A, a spacing D is provided between the lower edge of the upper casing 100A and the abutting mount 201. Forming the upper casing and the intermediate casing with such dimensions makes it possible, in the leftward felled-sidelong state and the rightward felled-sidelong state, to bring the upper casing 100A close to the center and to improve the stability when the user holds the mobile phone in a hand.

Figure 24:
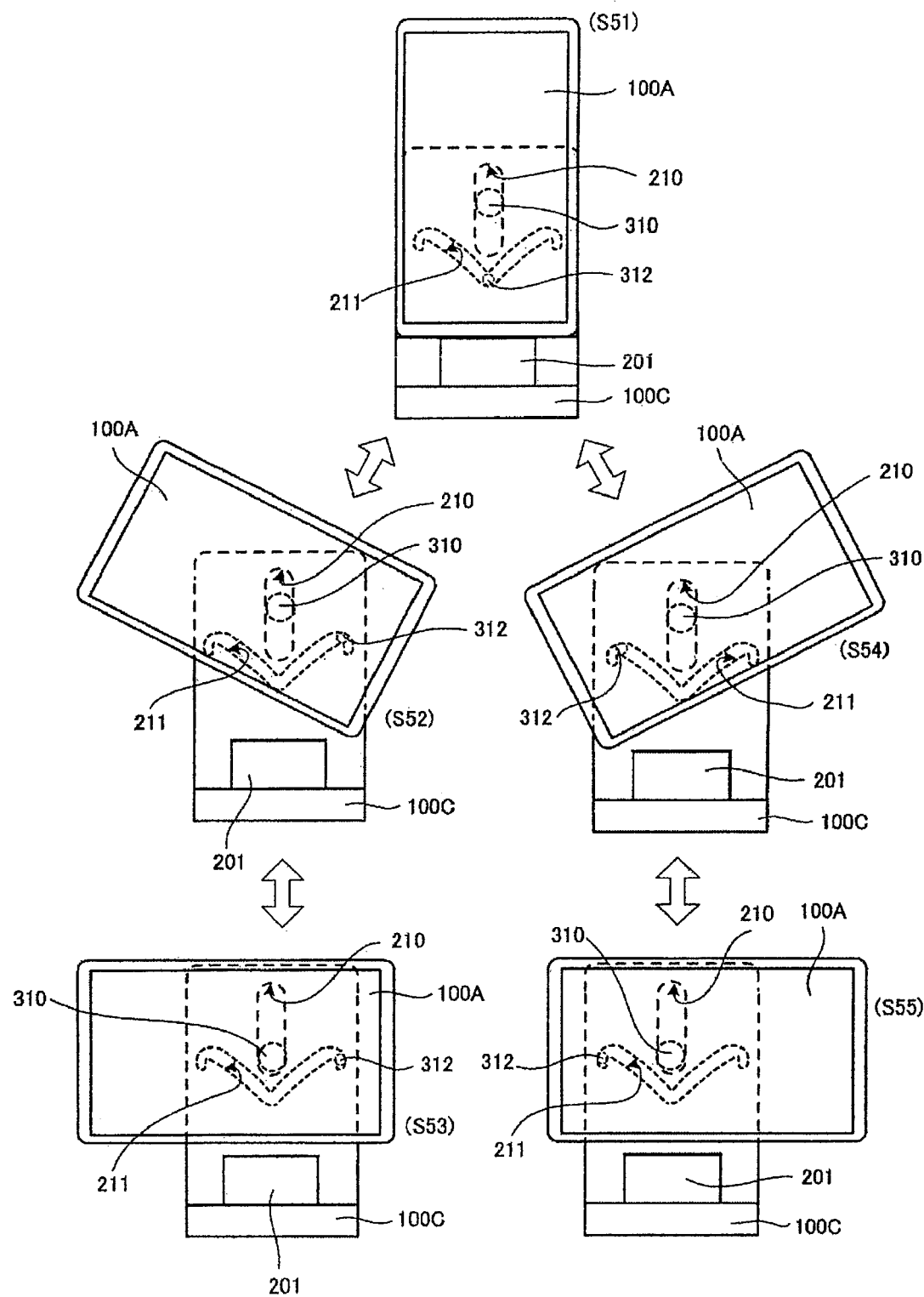
FIG. 24 is a diagram showing operations for inclining the upper casing toward the lower casing.

FIG. 24 is a diagram showing operations for inclining the upper casing 100A toward the lower casing 100B.

As shown in FIG. 23B also, when the upper casing 100A is in the upright state (step 51 in FIG. 24), the protrusion 310 is located at the central position of the longitudinal groove 210, and the auxiliary protrusion 312 is located at the lowest position of the V-groove 211.

When the user inclines the upper casing 100A toward the left side, the protrusion 310 is guided by the longitudinal groove 210, and the auxiliary protrusion 312 is guided by the right side groove of the V-groove 211 and moves along it, whereby the upper casing 100A rotates in the left direction (step S52 in FIG. 24).

When the upper casing 100A is rotated up to the leftward felled-sidelong state (step 53 in FIG. 24), the upper casing 100A is subjected to an interference with the abutting mount 201, and the movement of the upper casing 100A is stopped.

On the other hand, when the user inclines the upper casing 100A toward the right side (step 54 in FIG. 24), the protrusion 310 is guided by the longitudinal groove 210 and the auxiliary protrusion 312 is guided by the left side groove of the V-groove 211 and moves along it, whereby the upper casing 100A is rotated in the right direction and felled sidelong rightward with respect to the lower casing 100B (step S55 in FIG. 24).

In this manner, according to the mobile phone according to this embodiment, the upper casing 100A can be brought close to the center when the upper casing 100A is inclined.

An eighth embodiment according to the present invention will now be described. Because the eighth embodiment has the same construction as that of the seventh embodiment except that, in this embodiment, the dimension of a spacing between the intermediate casing and the intermediate casing is different from that of the seventh embodiment, only differences of the eighth embodiment from the seventh embodiment are described.

FIGS. 25A and 25B are diagrams showing various dimensions in the mobile phone according to this embodiment.

In the mobile phone according to this embodiment, when the distance between the right edge of the intermediate casing 100C and that of the upper casing 100A in the leftward felled-sidelong state shown in FIG. 25A is represented as α, and the distance between the center of the protrusion 310 and that of the auxiliary protrusion 312 is represented as F, and when the distance between the lower edge of the upper casing 100A in the upright state shown in FIG. 25B and the abutting mount 201 is represented D, let the distance between the right edge of the upper casing 100A and the center of the protrusion 310 in the leftward felled-sidelong state shown in FIG. 25A be (E+α), and let the distance between the center of the protrusion 310 and the center of the auxiliary protrusion 312 in the upright state of the upper casing 100A shown in FIG. 25B be F. According to the mobile phone of this embodiment, when the upper casing 100A is inclined up to the leftward felled-sidelong state or the rightward felled-sidelong state, it is possible to bring the upper casing 100A close to the center and to raise up the upper casing 100A.

Next, a ninth embodiment according to the present invention will be described. In the ninth embodiment of the present invention also, the same components as those in the first embodiment are designated by the same symbols, and description thereof is omitted. Only differences of the ninth embodiment from the first embodiment are described.

Figure 26:
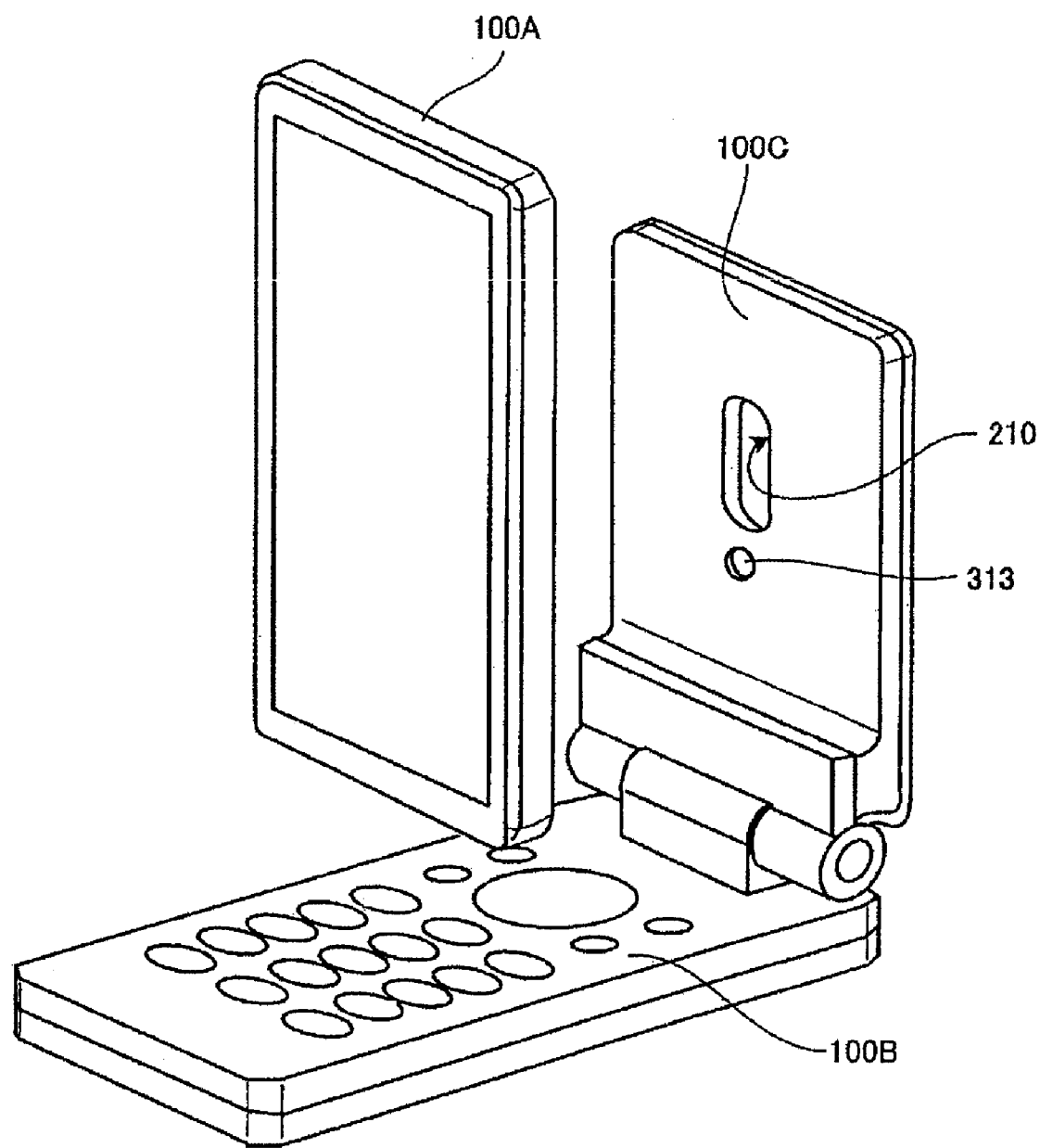
FIG. 26 is a diagram showing the surface side of the intermediate casing in a mobile phone according to a ninth embodiment of the present invention.

FIG. 26 is a diagram showing the surface side of the intermediate casing 100C in the mobile phone according to this embodiment.

As shown in FIG. 26, as in the case of the intermediate casing 100C in the first embodiment shown in FIG. 3, the intermediate casing 100C in this embodiment has a longitudinal groove 210 that vertically extends, and further has an auxiliary protrusion 313 that protrudes toward the lower casing 100B. This auxiliary protrusion 313 is also one example of what the present invention terms "guide pin".

Figure 27:
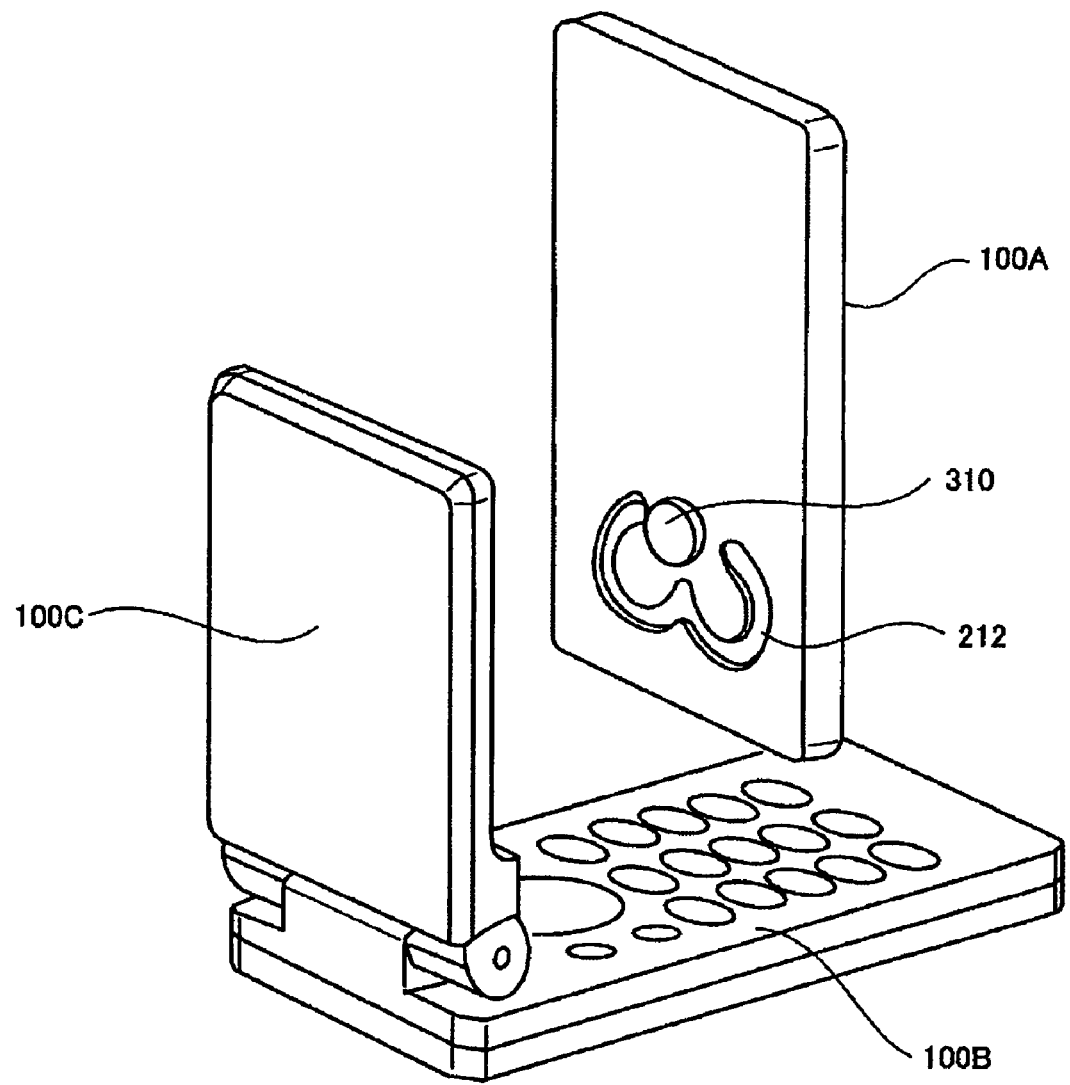
FIG. 27 is a diagram showing the back surface side of the upper casing.

FIG. 27 is a diagram showing the back surface side of the upper casing 100A in the mobile phone according to this embodiment.

As in the case of the upper casing 100A in the first embodiment shown in FIG. 4, the upper casing 100A in this embodiment has a protrusion 310 to be fitted into the longitudinal groove 210, and further has an arcuate groove 212 into which the auxiliary protrusion 313 is to be fitted. The arcuate groove 212 has a shape such that bilaterally symmetrical two arc-shaped grooves are connected at the center of the arcuate groove. This arcuate groove 212 is also one example of what the present invention terms "guide groove".

Figure 28:
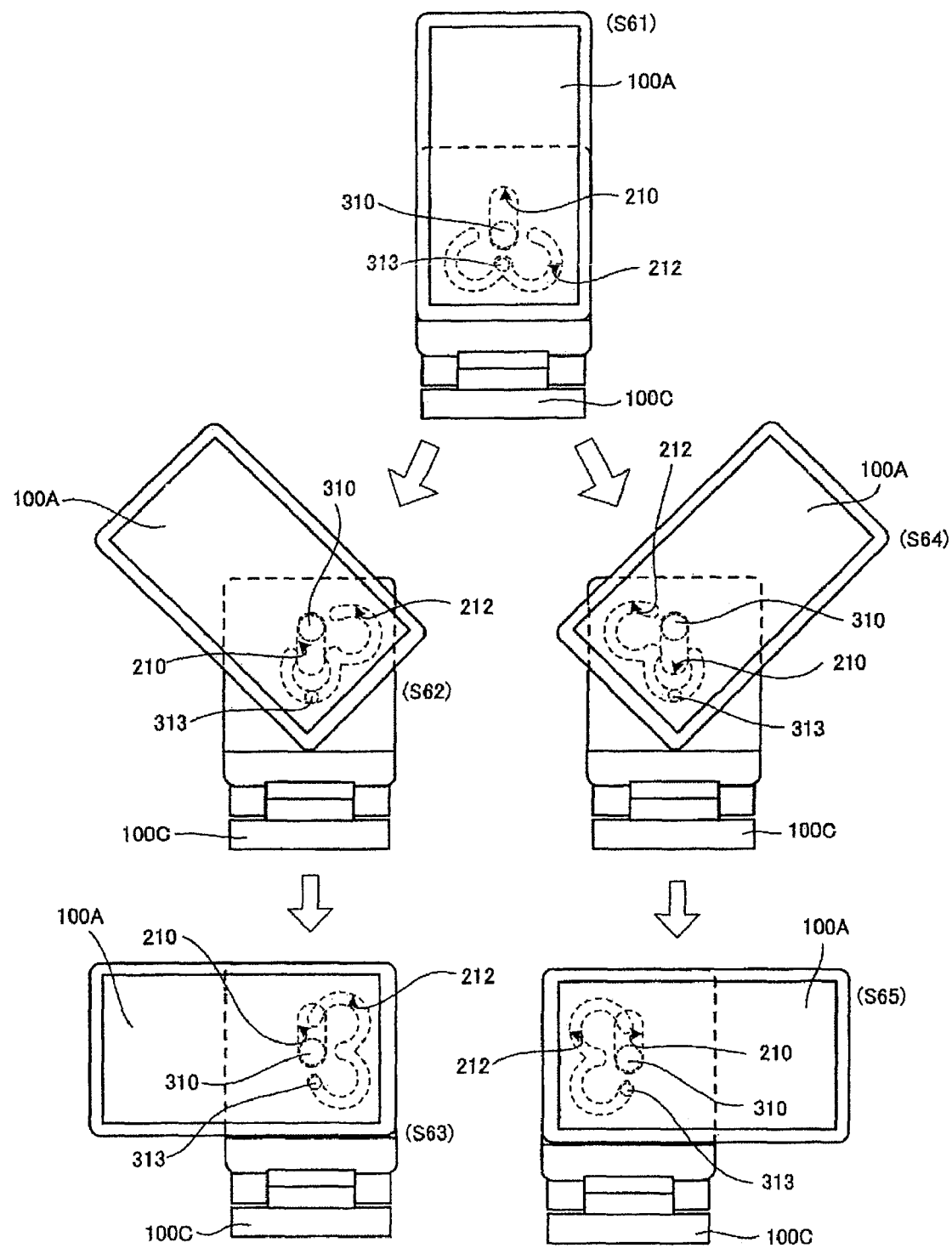
FIG. 28 is a diagram showing operations for inclining the upper casing toward the lower casing.

FIG. 28 is a diagram showing operations for inclining the upper casing 100A toward the lower casing 100B.

When the upper casing 100A is in the upright state (step 61 in FIG. 28), the protrusion 310 is located at the lowest position of the longitudinal groove 210, and an auxiliary protrusion 313 is fitted in the central position of the arcuate groove 212.

When the user inclines the upper casing 100A toward the left side, first, the protrusion 310 is guided by the longitudinal groove 210 to thereby vertically moves, and the left side groove of the arcuate groove 212 slides with the auxiliary protrusion 313 fitted-in, whereby the upper casing 100A rotates in the left direction (step S62 in FIG. 28).

In the leftward felled-sidelong state in which the upper casing 100A is felled sidelong leftward with respect to the lower casing 100B (step 63 in FIG. 28), the protrusion 310 has been moved to the lowest position of the longitudinal groove 210, and the auxiliary protrusion 313 is fitted in the front end of the left side groove of the arcuate groove 212.

On the other hand, when the user inclines the upper casing 100A toward the right side (step 64 in FIG. 28), the protrusion 310 is guided by the longitudinal groove 210, and the right side groove of the arcuate groove 212 slides with the auxiliary protrusion 313 fitted-in, whereby the upper casing 100A rotates in the right direction (step S65 in FIG. 28). As described above, using the arcuate groove instead of the V-groove allows the upper casing 100A to be smoothly inclined, as well. Furthermore, sliding the groove with the auxiliary protrusion fitted-in instead of moving the auxiliary protrusion along the groove allows the upper casing 100A to be rotated, as well.

Hereinbefore, examples in which the mobile terminal device according to the present invention is applied to mobile phones have been described, but the mobile terminal device according to the present invention may be applied to a personal digital assistant (PDA) and so on.

Also, in the forgoing description, examples in which the longitudinal groove is provided in the intermediate casing, and the protrusion is provided in the upper casing have been explained. However, the vertical groove termed by the present invention may be provided in the upper casing instead of the intermediate casing, and the protrusion termed by the present invention may be provided in the intermediate casing instead of the upper casing.

Besides, the hinge portion termed by the present invention may be configured integrally with the intermediate casing or the lower casing, or alternatively, may be configured as a hinge module, individually of the casings.

What is claimed is:

1. A mobile terminal device comprising:
   a lower casing;
   an upper casing; and
   an intermediate casing connected to the lower casing by a hinge structure which enables the intermediate casing to rotate about an axis, the intermediate casing supporting a back surface of the upper casing by a front surface of the intermediate casing, wherein a first casing which is either the upper casing or the intermediate casing has a first groove formed in a vertical direction with respect to the rotation axis on a surface facing a second casing which is the other of the upper casing and the intermediate casing,
   the second casing has a first portion protruding from a surface facing the first casing and fitting the first groove of the first casing, the first portion moving upward or downward under a guidance of the first groove, and
   the upper casing rotates with respect to the intermediate casing for the portion being guided by the first groove.

2. The mobile terminal device according to claim 1, further comprising:
   a resiliently-urging member for urging the upper casing in the downward direction resiliently, the resiliently-urging member being sandwiched between the upper casing and the intermediate casing.

3. The mobile terminal device according to claim 1, further comprising:
   a guide for guiding the upper casing by contacting against the upper casing when rotating the upper casing, the guide being provided to the hinge structure.

4. The mobile terminal device according to claim 1, wherein the first casing comprises a guide groove for guiding a move of the first portion in the first groove when rotating the upper casing; and
   wherein the second casing comprises a guide pin for getting into the guide groove and regulating the move of the first portion in the first groove when rotating the upper casing.

5. The mobile terminal device according to claim 4, wherein the guide groove is formed that the guide groove obliquely heads from the center thereof toward the left and right in a bilaterally symmetrical manner.

6. The mobile terminal device according to claim 4, wherein the guide groove is formed of two arcuate shape being connected at the center thereof in a bilaterally symmetrical manner.

7. The mobile terminal device according to claim 4, wherein the guide pin has a hole, and an electrical cable runs from the upper casing to the lower casing through the hole in the guide pin.

8. The mobile terminal device according to claim 4, wherein the guide groove allows the right edge of the upper casing at the time when the upper casing is in a leftward felled-sidelong state to be in one plane with the right edge of the intermediate casing, and allows the left edge of the upper casing at the time when the upper casing is in a rightward felled-sidelong state to be in one plane with the left edge of the intermediate casing, the leftward felled-sidelong state being a state in which the upper casing has been inclined toward the left side up to a felled-sidelong state and the rightward felled-sidelong state being a state in which the upper casing has been inclined toward the right side up to the felled-sidelong state.

9. The mobile terminal device according to claim 4, wherein the guide groove allows the right edge of the upper casing at the time when the upper casing is in a leftward felled-sidelong state to protrude toward the right side from the right edge of the intermediate casing, and allows the left edge of the upper casing at the time when the upper casing is in a rightward felled-sidelong state to protrude toward the left side from the left edge of the intermediate casing, the leftward felled-sidelong state being a state in which the upper casing has been inclined toward the left side up to a felled-sidelong state and the rightward felled-sidelong state being a state in which the upper casing has been inclined toward the right side up to the felled-sidelong state.

10. The mobile terminal device according to claim 1,
   wherein the second casing comprises a guide groove for guiding a move of the first portion in the first groove when rotating the upper casing; and
   wherein the first casing comprises a guide pin for getting into the guide groove and regulating the move of the first portion in the first groove when rotating the upper casing.

11. The mobile terminal device according to claim 1, wherein the hinge structure comprises a pillow contacting against the surface of the upper casing adjacent to the hinge structure for regulating the move of the first portion in the first groove when rotating the upper casing.

12. The mobile terminal device according to claim 1, wherein the first portion has a hole, and an electrical cable runs from the upper casing to the lower casing through the hole in the first portion.

13. The mobile terminal device according to claim 1,
   wherein the hinge structure has recess portions for rotating the upper casing at the right and left end portions of the hinge structure.

14. The mobile terminal device according to claim 1,
   wherein the upper casing comprises a recess portion on each of both sides of the side of the upper casing adjacent the lower casing at the time when the upper casing is in a upright state, the upright state being an intermediate state between a leftward felled-sidelong state and a rightward felled-sidelong state, the leftward felled-sidelong state being a state in which the upper casing has been inclined toward the left side up to a felled-sidelong state and the rightward felled-sidelong state being a state in which the upper casing has been inclined toward the right side up to the felled-sidelong state; and
   wherein the intermediate casing comprises;
      moving claws each of fitting into the recess portion and horizontally move to thereby for rotating the upper casing
      an auxiliary resiliently-urging member for urging resiliently the moving claws in the directions in which the moving claws pull each other in the horizontal direction;
      inhibition claws each of interfering with a respective one of the movement claws to thereby inhibit the movement of the respective one of the movement claws; and
      an operator releasing the interference of the inhibition claws with the movement claws by being subjected to a pressure.

15. The mobile terminal device according to claim 1,
   wherein the intermediate casing comprises a rack gear that horizontally extends; and
   wherein the upper casing comprises pinion gears that mesh with the rack gear, and motors that turn the upper casing by rotationally driving the pinion gears, the pinion gears and the motors being provided at the left and right corners of the upper casing adjacent to the lower casing at the time when the upper casing is in the upright state.

* * * * *